US010904366B2

(12) United States Patent
Kloberdans et al.

(10) Patent No.: US 10,904,366 B2
(45) Date of Patent: Jan. 26, 2021

(54) ASSURING DATA DELIVERY FROM INTERNET OF THINGS (IOT) DEVICES

(71) Applicant: Charter Communications Operating, LLC, St. Louis, MO (US)

(72) Inventors: Michael J. Kloberdans, Brighton, CO (US); Yuija Zhou, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 70 days.

(21) Appl. No.: 16/164,890

(22) Filed: Oct. 19, 2018

(65) Prior Publication Data

US 2020/0128114 A1    Apr. 23, 2020

(51) Int. Cl.
*H04L 29/06* (2006.01)
*H04L 29/08* (2006.01)
(Continued)

(52) U.S. Cl.
CPC ............ *H04L 69/22* (2013.01); *G06F 16/951* (2019.01); *H04L 47/323* (2013.01);
(Continued)

(58) Field of Classification Search
CPC ..... H04L 69/16; H04L 69/167; H04L 69/169; H04L 69/22; H04L 61/2007; H04L 61/25; H04L 61/2503; H04L 61/2507; H04L 61/251; H04L 67/12; H04L 47/323; G06F 16/951
See application file for complete search history.

(56) References Cited

U.S. PATENT DOCUMENTS 7,792,963 B2    9/2010 Gould et al.
10,567,245 B1 *  2/2020 Patil ................... H04W 72/048
(Continued)

OTHER PUBLICATIONS

Shelby, et al. Internet Engineering Task Force (IETF) RFC7252, The Constrained Application Protocol (CoAP), Jun. 2014, 112 pages https://tools.ietf.org/html/rfc7252.
(Continued)

*Primary Examiner* — Kevin D Mew
(74) *Attorney, Agent, or Firm* — Otterstedt, Wallace & Kammer, LLP

(57) ABSTRACT

Obtain, from a subscriber premises gateway, a data packet having a header field including a unique identifier for a combination of the gateway and a connected subscriber IP device. Transport the data packet through an internal network of a broadband service provider. Remove the header field after the transporting and prior to the data packet exiting the internal network of the broadband service provider to an external network. Store, in a subscriber internet protocol device data repository of the broadband service provider, data, including the header field, representing transport of the data packet through the internal network of the broadband service provider to the external network. Detect, based on the data repository, at least one of an internal and an external anomaly associated with the data packet. Initiate at least one mitigation action in response to the detecting of the at least one of an internal and an external anomaly.

35 Claims, 13 Drawing Sheets

(51) Int. Cl.
*H04L 29/12* (2006.01)
*H04L 12/823* (2013.01)
*G06F 16/951* (2019.01)

(52) U.S. Cl.
CPC .......... *H04L 61/2007* (2013.01); *H04L 67/12* (2013.01); *H04L 69/16* (2013.01)

(56) References Cited

U.S. PATENT DOCUMENTS

| | | | |
|---|---|---|---|
| 2003/0056217 | A1 | 3/2003 | Brooks |
| 2006/0130107 | A1 | 6/2006 | Gonder et al. |
| 2007/0217436 | A1 | 9/2007 | Markley et al. |
| 2009/0248794 | A1 | 10/2009 | Helms et al. |
| 2010/0313236 | A1 | 12/2010 | Straub |
| 2015/0188949 | A1* | 7/2015 | Mahaffey .......... H04W 12/0027 726/1 |
| 2016/0080502 | A1* | 3/2016 | Yadav ................ H04L 47/22 709/227 |
| 2017/0091204 | A1* | 3/2017 | Minwalla ............ G06F 16/9537 |
| 2018/0060159 | A1* | 3/2018 | Justin ................. G06F 11/0787 |
| 2018/0285234 | A1* | 10/2018 | Degaonkar ........... H04L 41/069 |
| 2018/0316650 | A1* | 11/2018 | Forde ........................ H04J 3/06 |
| 2018/0343238 | A1* | 11/2018 | Tola ........................ H04L 67/12 |
| 2019/0124572 | A1* | 4/2019 | Park .................. H04W 72/0446 |
| 2019/0132207 | A1* | 5/2019 | Nataraj .................. H04L 69/16 |
| 2019/0132377 | A1* | 5/2019 | Hulick, Jr. .............. H04L 67/02 |
| 2019/0245894 | A1* | 8/2019 | Epple ...................... G06F 21/56 |
| 2019/0364492 | A1* | 11/2019 | Azizi .................. H04W 92/045 |

OTHER PUBLICATIONS

IoT Number of Connected Devices, Statista, 3 pages, downloaded Oct. 30, 2018 https://www.statista.com/statistics/471264/iot-number-of-connected-devices-worldwide.
Koetsier, Smart Speaker Penetration among US Wi-Fi households, Forbes, Apr. 11, 2018, 3 pages https://www.forbes.com/sites/johnkoetsier/2018/04/11/smart-speaker-penetration-just-exploded-50-in-3-short-months/#4e7e8d484fbf.
Lawful Intercept Overview, Cisco 10000 Series Router Lawful Intercept Configuration Guide, Chapter 1, 8 pages https://www.cisco.com/c/en/us/td/docs/routers/10000/10008/feature/guides/lawful_intercept/10LIovr.html.
Lawfully Authorized Electronic Surveillance, TIA/EIA/J-STD-025A, May 31, 2000, 208 pages http://cryptome.org/espy/TR45-jstd025a.pdf.
PacketCable Electronic Surveillance Delivery Function to Collection Function Specification, PKT-SP-ES-DCI-I02-070925, downloaded Mar. 29, 2019, 70 pages http://www.cable-europe.eu/wp-content/uploads/bsk-pdf-manager/33_PKT-SP-ES-DCI-I02-070925.PDF.
X. Li, et al. Internet Engineering Task Force (IETF) RFC7599, Mapping of Address and Port using Translation (MAP-T), Jul. 2015, 27 pages https://tools.ietf.org/html/rfc7599.
O. Troan, et al. Internet Engineering Task Force (IETF) RFC7597, Mapping of Address and Port with Encapsulation (MAP-E), Jul. 2015 https://tools.ietf.org/html/rfc7597.
Adheretech, downloaded Oct. 30, 2018, 6 pages https://www.adheretech.com/.
Proteus, downloaded Oct. 30, 2018, 7 pages https://www.proteus.com/.
Proteus Press Release, Proteus Digital Health® Announces Digital Medicines Pipeline Development and Expansion into Oncology, Apr. 25, 2018 https://www.proteus.com/press-releases/proteus-digital-health-announces-digital-medicines-pipefine-development-and-expansion-into-oncology/.
PhysIQ, downloaded Oct. 30, 2018, 5 pages https://www.physiq.com/.
Honeywell Life Care Solutions, Honeywell HomMed Products and Services Fill in the Complete Picture of Patient Health, May 18, 2014 https://www.honeywelllifecare.com/press-kits/honeywell-hommed-products-and-services-fill-in-the-complete-picture-of-patient-health/.
CloudPlugs, Industrial IoT Solutions, downloaded Oct. 30, 2018, 11 pages https://cloudplugs.com/industrial-internet-of-things/.
VM Series, Cloud security that's as agile as your applications, data and users, downloaded Oct. 30, 2018, 9 pages https://www.paloaltonetworks.com/products/secure-the-cloud/vm-series.
Paloalto Networks, Virtual Routers, downloaded Oct. 30, 2018, 7 pages https://www.paloaltonetworks.com/documentation/80/pan-os/pan-os/networking/virtual-routers.
Paloalto Networks, Virtual Systems, downloaded Oct. 30, 2018, 4 pages https://www.paloaltonetworks.com/features/virtual-systems.
Wikipedia—DansGuardian, downloaded Oct. 30, 2018 from https://en.wikipedia.org/wiki/DansGuardian, pp. 1-3, page last edited Aug. 9, 2018.
Netcracker—Products/Solutions—SDN & NFV, downloaded Oct. 30, 2018, 12 pages https://www.netcracker.com/products/solutions/sdn-nfv/.
Wikipedia—Contrained Application Protocol, downloaded Oct. 30, 2018, from https://en.wikipedia.org/wiki/Constrained_Application_Protocol, pp. 1-7, last edited Oct. 15, 2018.
Wikipedia—Multiprotocol Label Switching downloaded Oct. 30, 2018 from https://en.wikipedia.org/wiki/Multiprotocol_Label_Switching, pp. 1-7, last edited Oct. 9, 2018.

* cited by examiner

| Device | Purpose |
|---|---|
| Home Gateway | Records IoT device data received at the home gateway |
| Access Network Router | Records IoT device data received at the Cable MSO access/core network |
| Cable MSO Egress Router | Records delivery of IoT device data from the Cable MSO egress point |

FIG.12

| Entry | IoT/HGW ID | HGW Time | Access Network Time | Egress Router Time |
|---|---|---|---|---|
| 1 | B0301 | 1 531 179 199.501 | Not Available | 1 531 179 200.691 |
| 2 | 40A4E | 1 531 179 200.519 | Not Available | Not Available |
| 3 | 665B2 | 1 531 179 198.637 | 1 531 179 198.660 | 1 531 179 199.112 |
| 4 | 665B2 | 1 531 179 798.243 | 1 531 179 798.651 | 1 531 179 799.145 |
| 5 | 665B2 | Not Available | Not Available | Not Available |

FIG.13

ASSURING DATA DELIVERY FROM INTERNET OF THINGS (IOT) DEVICES

FIELD OF THE INVENTION

The present invention relates generally to the electrical, electronic, and computer arts, and more particularly relates to broadband networks, the Internet of Things (IoT), and the Home Gateway.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 858 Coal Creek Circle, Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Internet of Things (IoT) devices enable Machine-to-Machine (M2M) data transmissions where a sensor or appliance (machine) at a subscriber's residence collects and sends information to a different machine at another location, such as a mobile phone application, a gateway, or even a data center. From that second machine, information is processed and made meaningful and available for human consumption. Many IoT devices can be characterized as "casual conveniences," such as changing the lighting color in the dining room or using voice commands to play a genre of music. More recently, a new class of IoT devices are emerging in homes and businesses that send more important messages such as personal healthcare data and industrial application data (e.g., factory temperature and pressure levels, etc.) to external processing or monitoring service providers.

SUMMARY OF THE INVENTION

Techniques are provided for assuring data delivery from Internet of Things (IoT) devices.

In one aspect, an exemplary method includes obtaining, from a subscriber premises gateway, a data packet having a header field including a unique identifier for a combination of the gateway and a connected subscriber internet protocol device; transporting the data packet through an internal network of a broadband service provider; removing the header field after the transporting and prior to the data packet exiting the internal network of the broadband service provider to an external network; storing, in a subscriber internet protocol device data repository of the broadband service provider, data, including the header field, representing transport of the data packet through the internal network of the broadband service provider to the external network; detecting, based on the data repository, at least one of an internal and an external anomaly associated with the data packet; and initiating at least one mitigation action in response to the detecting of the at least one of an internal and an external anomaly.

In still another aspect, an exemplary system includes an access network router device; an egress router; a database server storing a subscriber internet protocol device data repository of a broadband service provider; and an internal network of the broadband service provider, coupling the access network router device, the egress router, and the database server storing the subscriber internet protocol device data repository. The access network router device obtains, from a premises gateway, a data packet having a header field including a unique identifier for a combination of the gateway and a connected subscriber internet protocol device; the internal network of the broadband service provider transports the data packet; the egress router removes the header field after the transporting and prior to the data packet exiting the internal network of the broadband service provider to an external network; the database server stores, in the subscriber internet protocol device data repository of the broadband service provider, data, including the header field, representing transport of the data packet through the internal network of the broadband service provider to the external network; the database server detects, based on the data repository, at least one of an internal and an external anomaly associated with the data packet; and the database server initiates at least one mitigation action in response to the detecting of the at least one of an internal and an external anomaly.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., premises gateway (physical or virtualized), access router device, egress router, database server) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of the following:

1. A service that alerts subscribers when expected, periodic data is missing.
2. A service that proactively determines a disruption of IoT communications to the home gateway.
3. A service that provides assured data delivery for any IoT (or other) device that the subscriber deems important to them.
4. A partnership with external monitoring entities whereby the Service Provider proactively alerts the external monitoring entity along with the subscriber.
5. Capability to identify where on the timeline packets are dropped in the Internet or other external network, which can prove helpful in ascertaining root-cause of outages.
6. Capability to identify a general location of dropped packets within the Service Provider's network, including the home gateway, the access network and the system of core networks.

These and other features and advantages of the present invention will become apparent from the following detailed description of illustrative embodiments thereof, which is to be read in connection with the accompanying drawings.

BRIEF DESCRIPTION OF THE DRAWINGS

FIG. 12 is an exemplary table of devices that use the IPv6 flow label header, according to an aspect of the invention;

FIG. 13 is an exemplary table of IoT data repository database entries, according to an aspect of the invention.

DETAILED DESCRIPTION OF PREFERRED EMBODIMENTS

Figure 1:
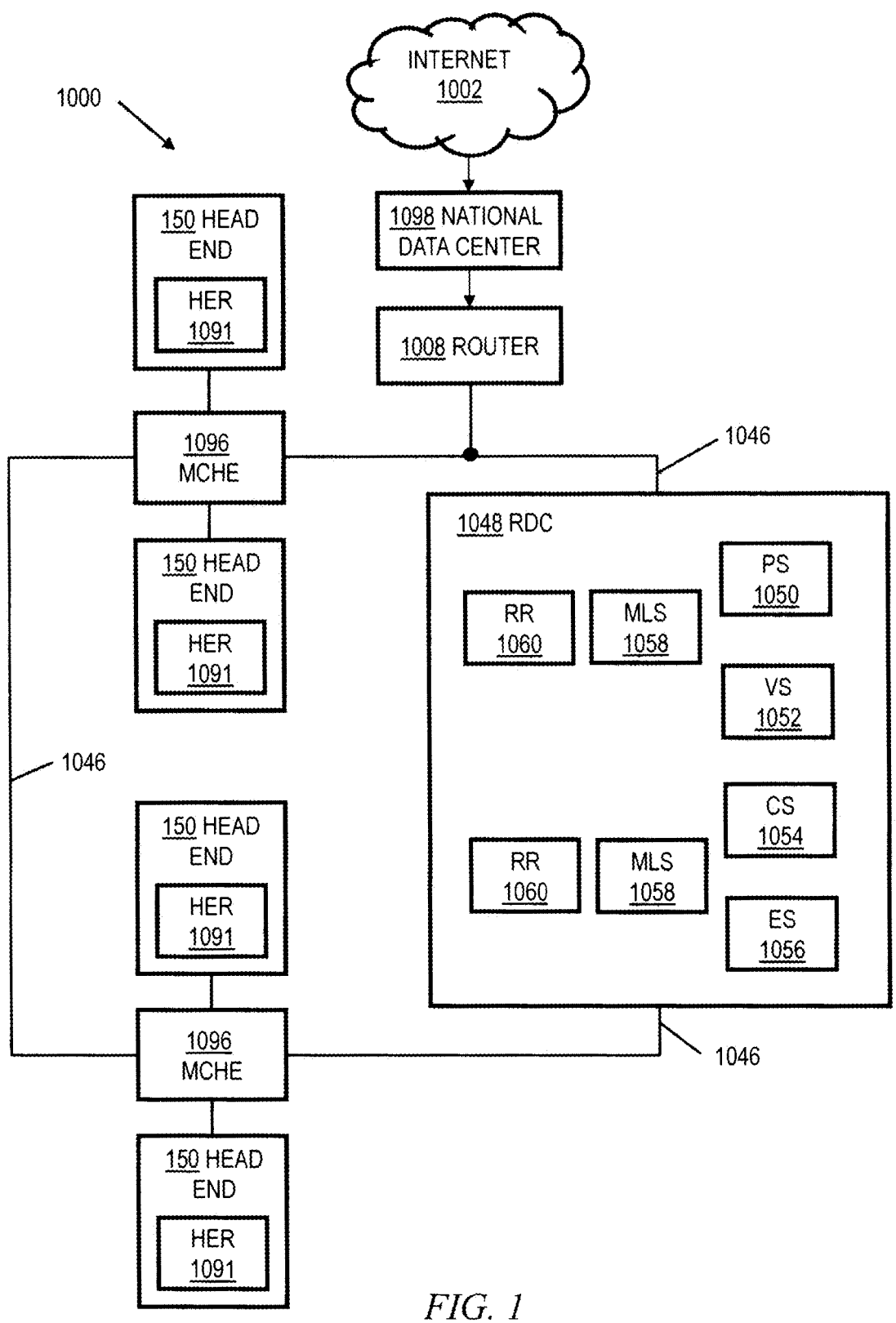
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
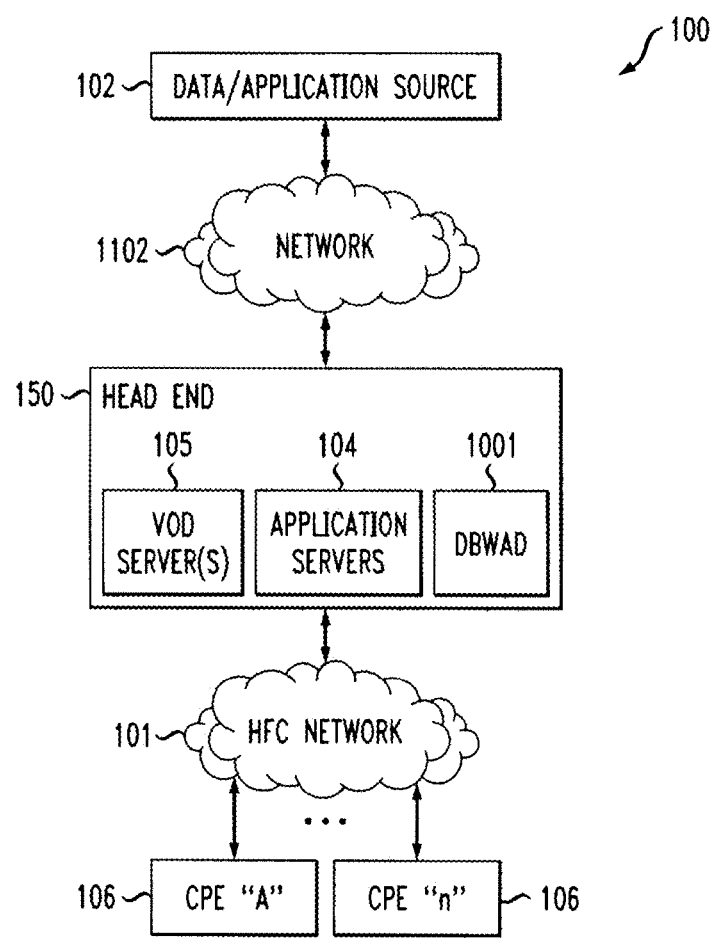
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
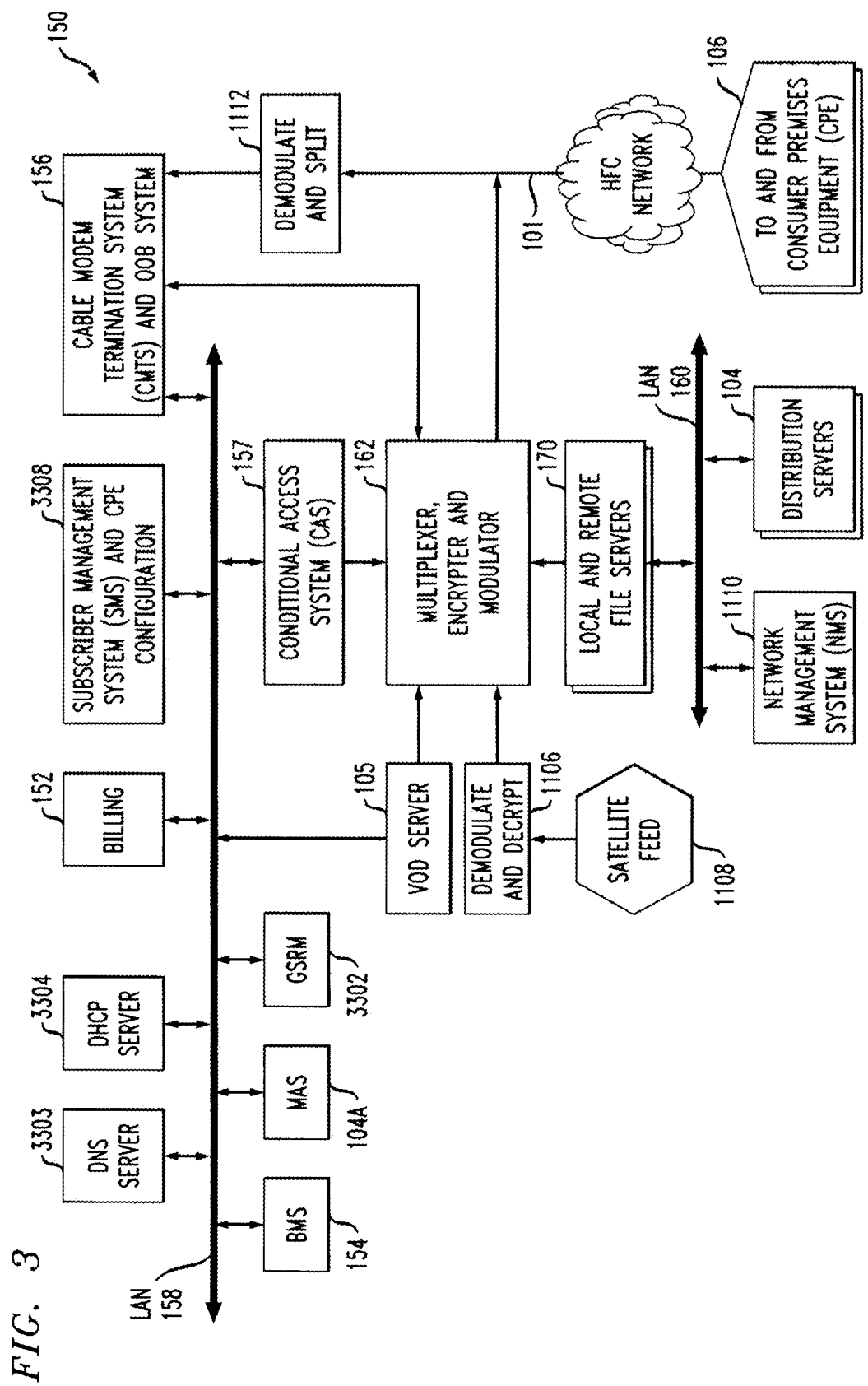
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 858 Coal Creek Circle, Louisville Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
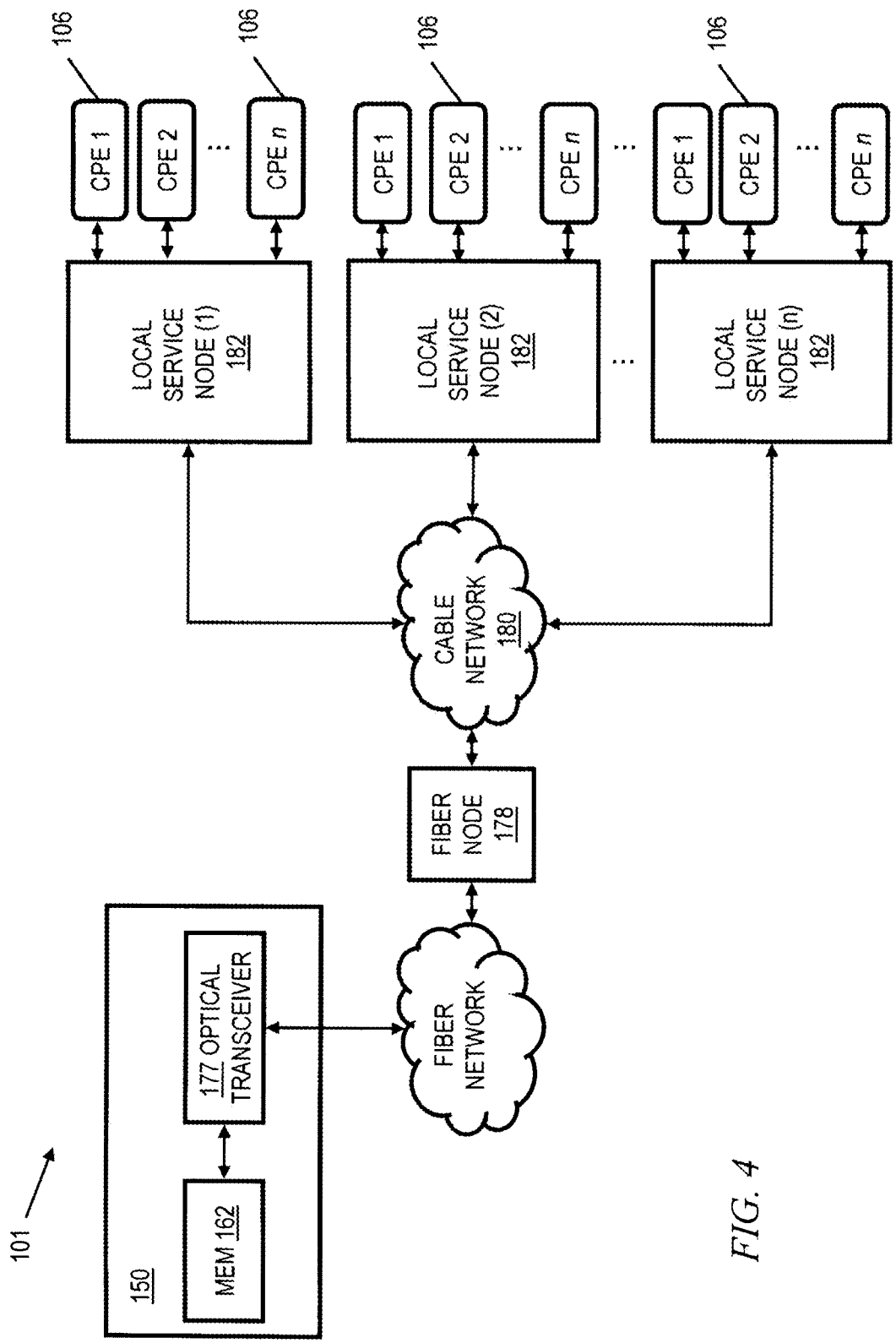
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
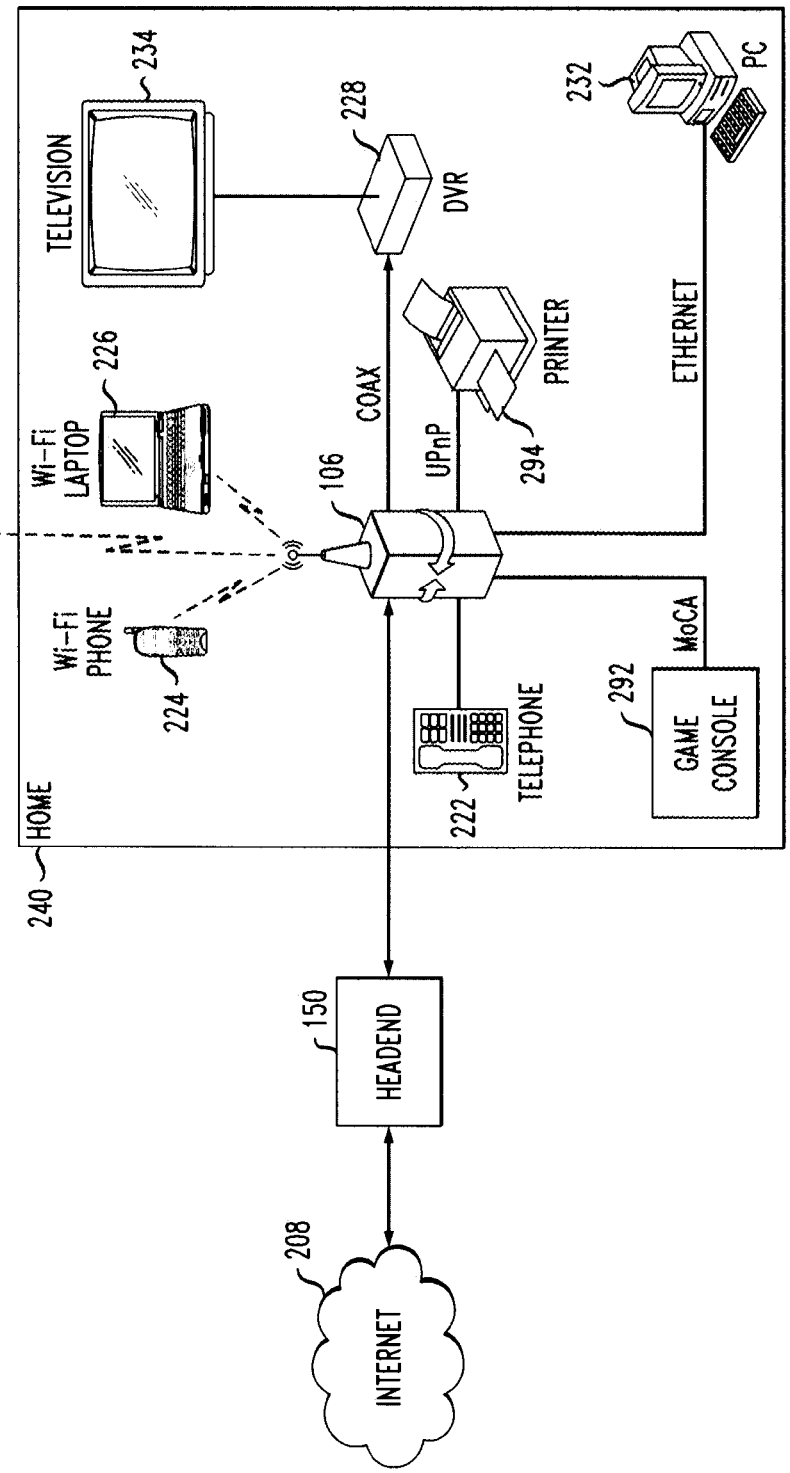
FIG. 5 is a functional block diagram of a premises network, including an exemplary centralized customer premises equipment (CPE) unit, interfacing with a head end such as that of FIG. 3.
Figure 6:
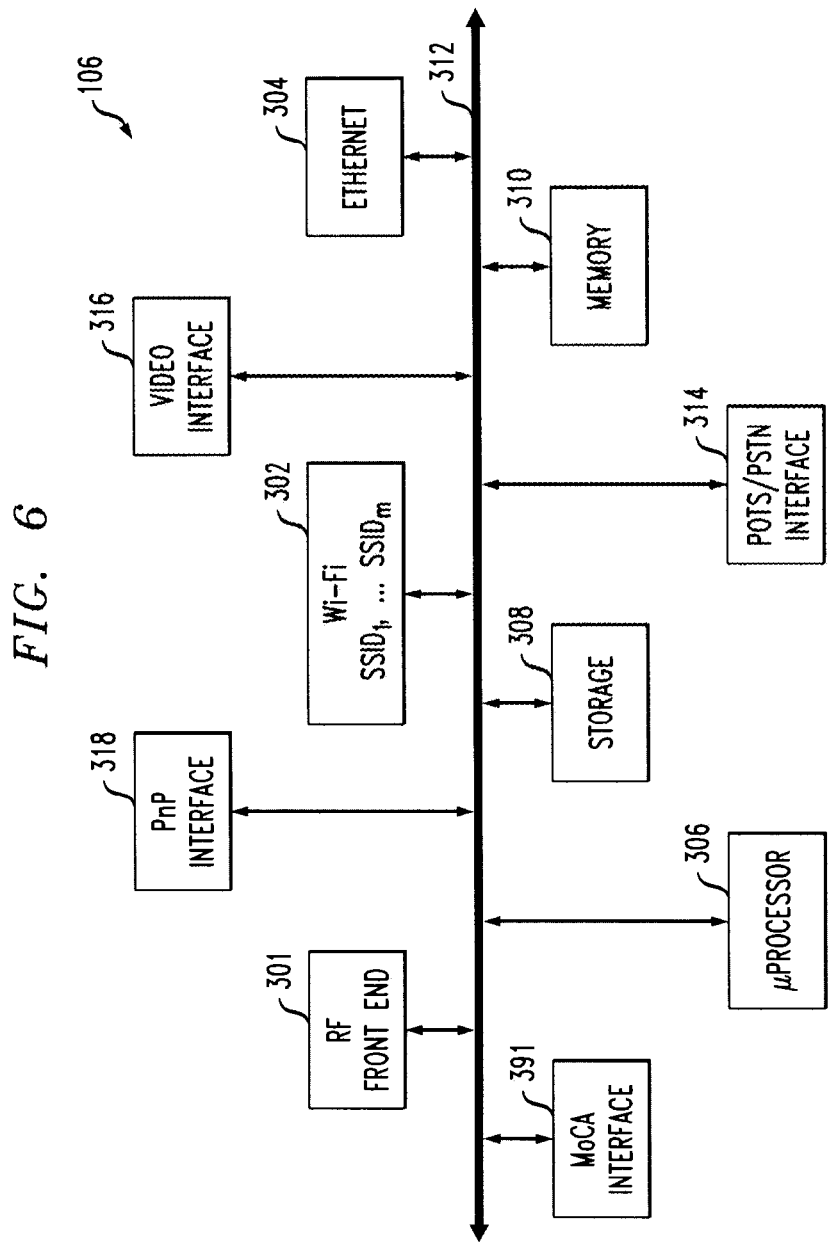
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. (not shown). Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface or an Apple MDNS protocol, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, CBRS, DECT, Bluetooth, Zigbee, Z-wave, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs), although multiple APs (Mesh or not) also perform the same network function as a single AP. In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM), FLASH memory and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
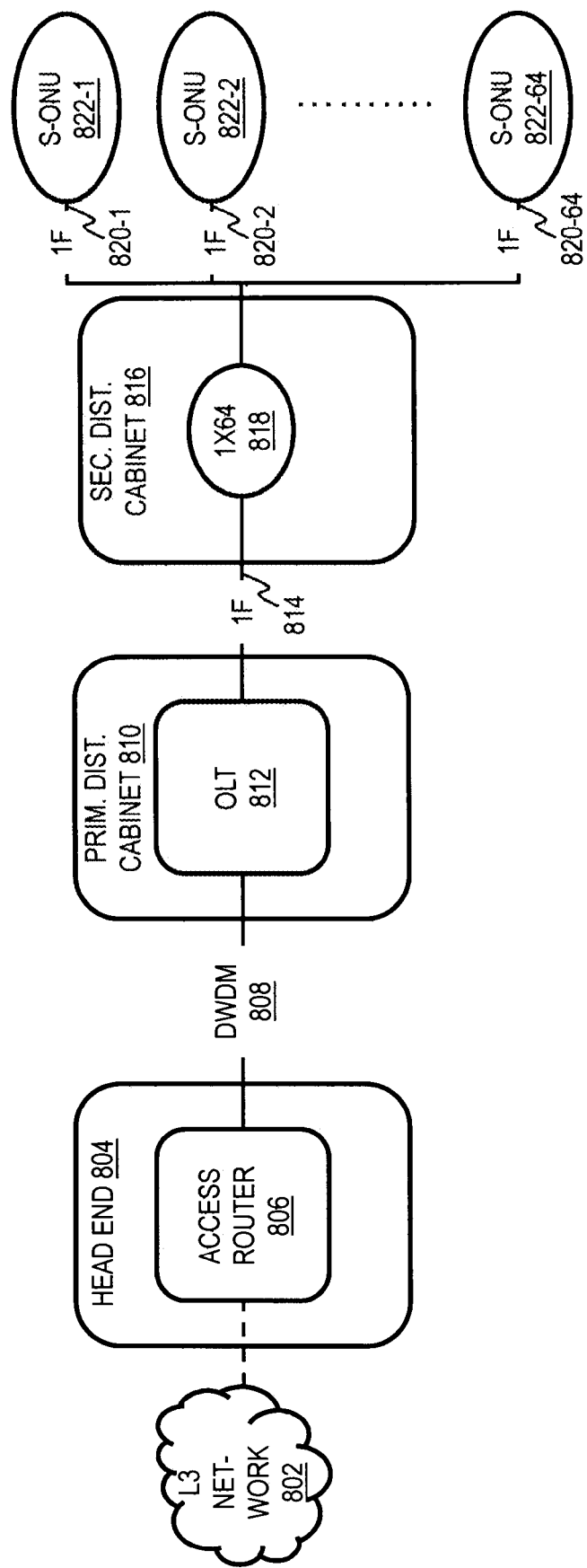
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
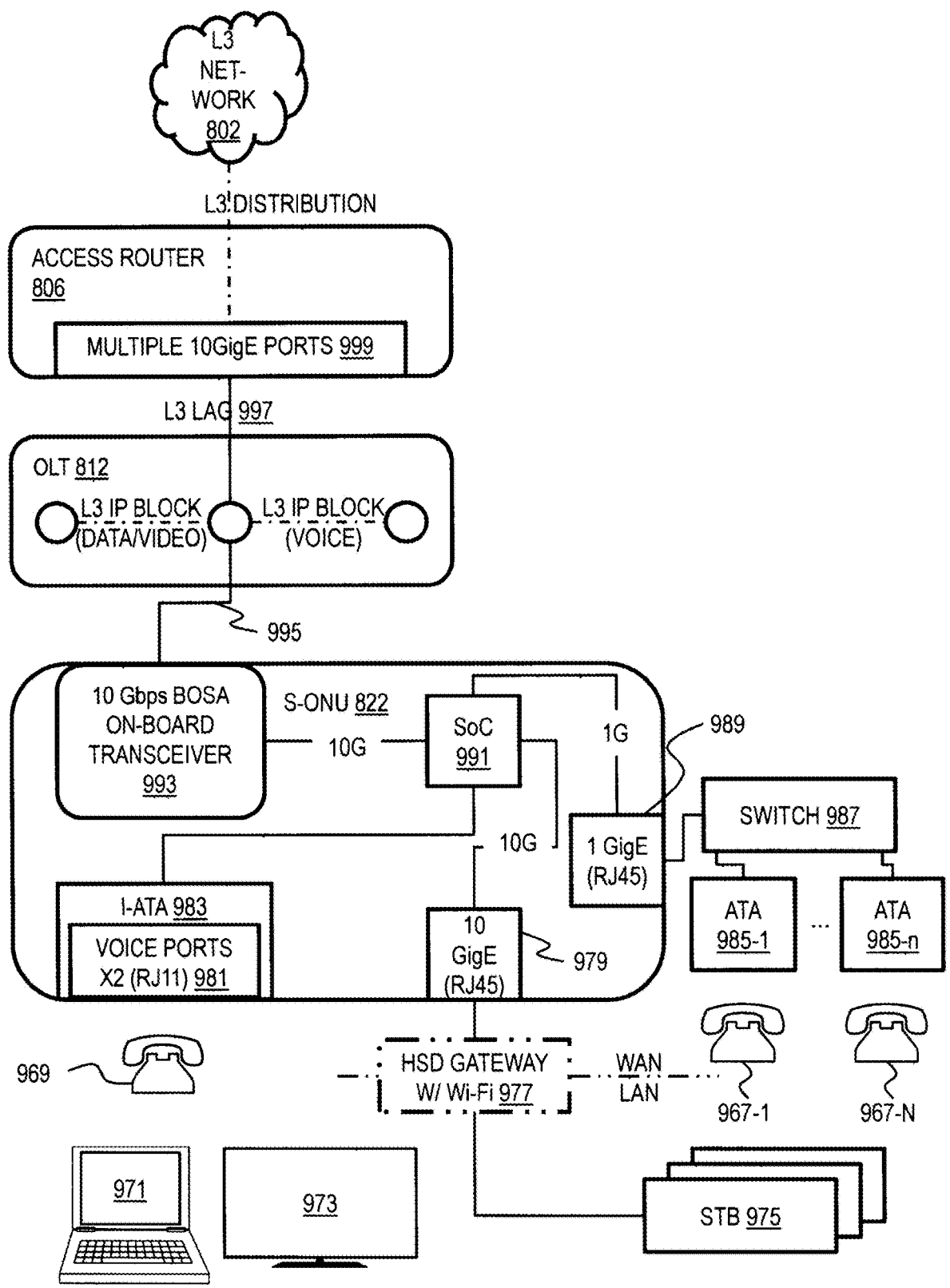
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10 G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As noted above, Internet of Things (IoT) devices enable Machine-to-Machine (M2M) data transmissions where a sensor or appliance (machine) at a subscriber's residence collects and sends information to a different machine at another location, such as a mobile phone application, a gateway, or even a data center. From that second machine, information is processed and made meaningful and available for human consumption. Many IoT devices can be characterized as "casual conveniences," such as changing the lighting color in the dining room or using voice commands to play a genre of music. More recently, a new class of IoT devices are emerging in homes and businesses that send more important messages such as personal healthcare data and industrial application data (e.g., factory temperature and pressure levels, etc.) to external processing or monitoring service providers.

IoT products have many categories: gaming (e.g., Sifteo Cubes from Sifteo, Inc., console sensors); Security (cameras, door/window sensors); convenience (smart speakers, light bulbs, window shades, smart kitchen appliances); monitoring (plant soil moisture, pet food levels, lawn watering, automotive); healthcare; and others. Recently, the healthcare market has been growing explosively, and is expected to reach $137 Billion in the next two years.

Another area that has grown rapidly is smart speaker devices. This category of IoT devices is interesting because they can control IoT devices as well as provide other services. Recent statistics indicate that existing smart speaker products increased 50% to 18.7 Million US households in just three months between November 2017 and February 2018. This penetration growth reflects a broad acceptance of automation in US homes.

If vital data packets from these IoT devices are dropped anywhere in the network path between the IoT device and a processing and/or monitoring provider across the Internet, the necessary IoT function can be compromised. This in turn could potentially lead to property damage, health, or safety problems. While critical IoT data devices use higher-layer data assurance protocols such as CoAP (Constrained Application Protocol) to acknowledge receipt of an IoT transmission, no receipt is currently possible if the source data fails to reach the processing/monitoring destination.

One or more embodiments advantageously provide one or more of the following benefits:
1. A service that alerts subscribers when expected, periodic data is missing.
2. Capability to identify where on the timeline packets are dropped in the Internet or other external network, which can prove helpful in ascertaining root-cause of outages.

Regarding the first point above, one or more embodiments alert a subscriber when messages from pertinent IoT devices drop. For example, a medical blood oxygen sensor at the subscriber home sends a regularly-scheduled blood oxygen level information to a 3$^{rd}$ party monitoring company. If these regularly-scheduled data packets are no longer being received and transported through the Cable MSO network (or that of another broadband provider), the subscriber and the monitoring company are notified for corrective action to avoid a potential serious health consequence.

As used herein, a "CSP" refers to a "Communications Service Provider." While non-limiting examples are provided in the context of a cable multi-services operator (MSO), embodiments are broadly applicable to many different types of networks; e.g., broadband networks generally; fiber-to-the-home (FTTH) providers; fiber-to-the-curb (FTTC) providers; satellite service providers; digital subscriber lines (DSLs) wherein packets can be tracked at a DSL modem, DSLAM (Digital Subscriber Line Access Multiplexer), and internal networks; HFC; and the like.

Regarding the second point above, one or more embodiments provide the ability to track packets in the Cable MSO networks (or networks of other broadband provider(s)) to establish where/when on the transmission route packets were dropped, including drop events occurring after delivery to a non-MSO network such as the Internet. In addition to root cause identification, this information can provide tracking visibility within the Cable MSO's systems of networks or other CSP networks.

The following points will be helpful to the skilled artisan regarding the disclosure herein; namely, registration, generic naming, and SMB applications.

- Registration: in one or more embodiments, pertinent IoT device data is identified and registered for tracking and notification services to begin. Exemplary details regarding this process are provided elsewhere herein, but for initial understanding, assume that the IoT device is pre-registered with the Cable MSO and its data is agreed as critical, important, or 'of interest' as discussed elsewhere herein. These IoT devices are referred to herein as a 'Registered IoT Device.' In one or more embodiments, the alerting services and data tracking concepts are confined to these Registered IoT Devices.
- Generic Names: the exemplary Cable MSO network device names used herein are generic because each Cable MSO has different network topologies and device function names. For example, there is typically no single egress point for a Cable MSO of any significant size; however, the examples disclosed herein present concepts that can be applied to the network topologies of any Cable MSO.
- SMB (small and medium-sized business) Applications: one or more exemplary embodiments are presented in the context of residential subscribers; however, the same benefits and procedures apply equally to SMB markets.

Data Delivery Network Architecture

Figure 10:
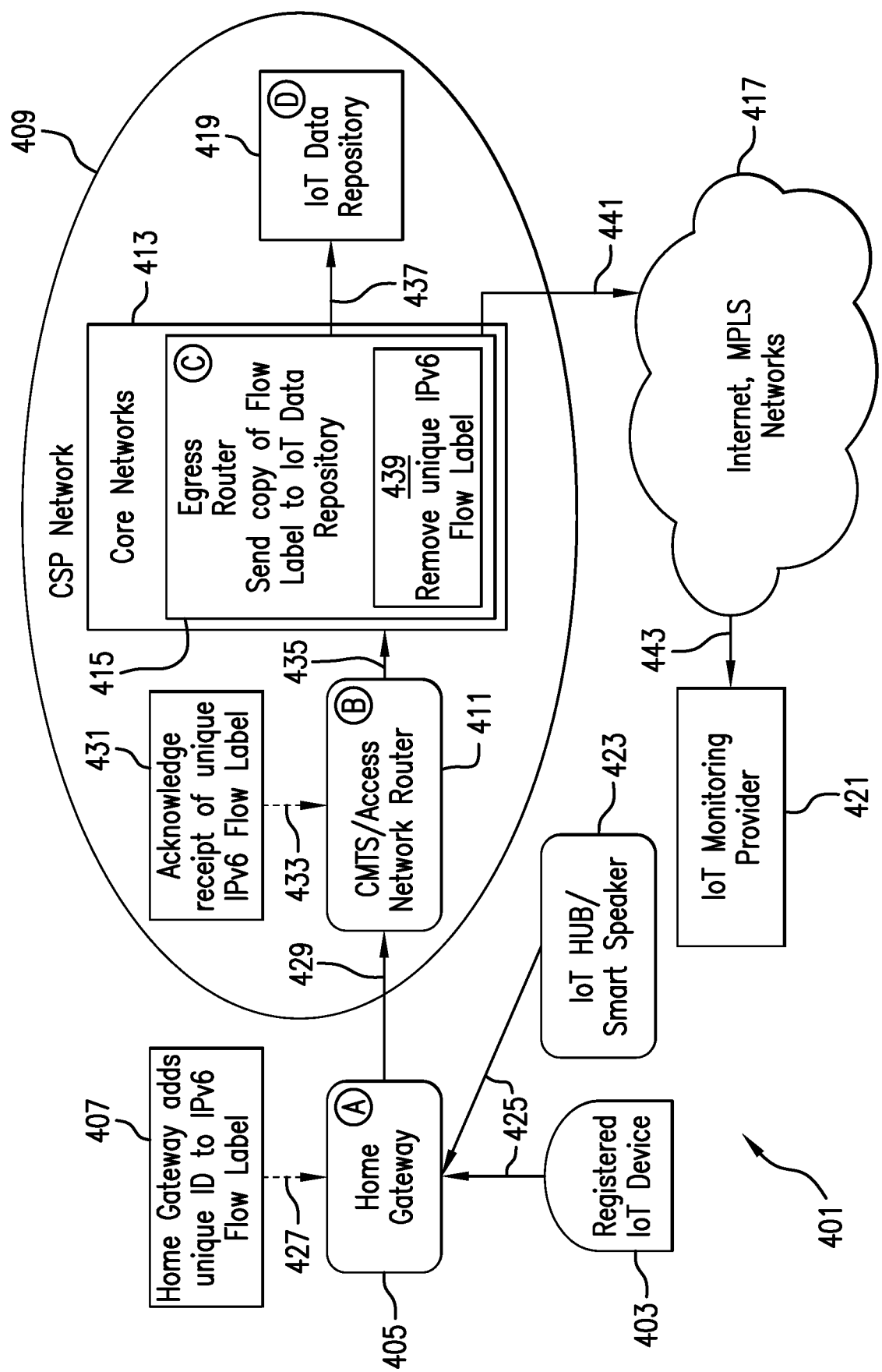
FIG. 10 is an IoT data delivery network architecture, according to an aspect of the invention.

IoT Packet/Header Flow in the Data Delivery Network Architecture: FIG. 10 depicts an architecture 401 of physical devices and software entities of an IoT data delivery system for important and/or critical data from an IoT device. Pertinent architecture components include an IoT device 403 that sends data to a Home Gateway (HGW) 405 where a unique ID is added identifying the specific IoT device and the Home Gateway receiving the IoT data (e.g., to the IPv6 Flow Label, as seen at 407). The Cable MSO premise 409 includes an Access Network router 411 that records HGW IoT packets and routes them through multiple network elements in the core network 413 including a final egress router 415 that both routes IoT data packets to a non-MSO network 417 and sends IoT IPv6 headers to the IoT Data Repository database 419. Finally, these IoT data packets are received by a 3rd party monitoring provider 421. Note also IoT hub/smart speaker 423. In one or more embodiments, the IoT Hub/Smart Speaker 423 is optionally used as an intermediary collector of IoT data before HGW 405 receives the IoT data.

In FIG. 10, element 405 is generally analogous to elements 106, 977; element 411 is generally analogous to elements 156, 806; element 413 is generally analogous to element 1008; and element 417 is generally analogous to element 1002 in the earlier figures.

In one or more embodiments, a device's packets use the User Datagram Protocol (UDP) transport protocol, which has no acknowledgement feature. Also, while some IoT devices may use encryption for security purposes, an IPv6 header is typically always available, which, in one or more embodiments, contains and tracks the unique ID.

At 425, a registered IoT device 403, hub or smart speaker 423 sends IPv4/IPv6 packet(s) to a Home Gateway (HGW) 405. At 427, the HGW 405 adds a unique ID to the IPv6 Flow Label field that identifies a registered IoT device and the HGW and stores a copy of the IoT header and a timestamp in a local database. At 429, the HGW sends the packets through a Cable Modem (CM), or an Optical Network Unit (ONU) to an Access Network (AN) Router 411. At 431, 433, the AN Router 411 sends a copy of the IoT data header and timestamp to an IoT data repository database 419. At 435, the Access Network Router 411 sends the original data frame to the Cable MSO's core network infrastructure 413. At 437, the Core Network (CN) Egress Router 415 sends a copy of the IoT data header and timestamp to the same IoT data repository database 419 as in step 433. In step 439, the CN Egress Router 415 removes the unique ID from the IP packet. In step 441, the CN Egress Router 415 sends the data frame to a non-MSO network 417 such as the Internet. In step 443, the data packet is delivered to the final destination, such as an IoT Monitoring Provider 421.

In FIG. 10, the text in components 407, 431, 439, and the text "send copy of flow label to IoT data repository" in router 415 denotes actions that happen with an associated device and not a flow of packets or header copies.

Figure 11:
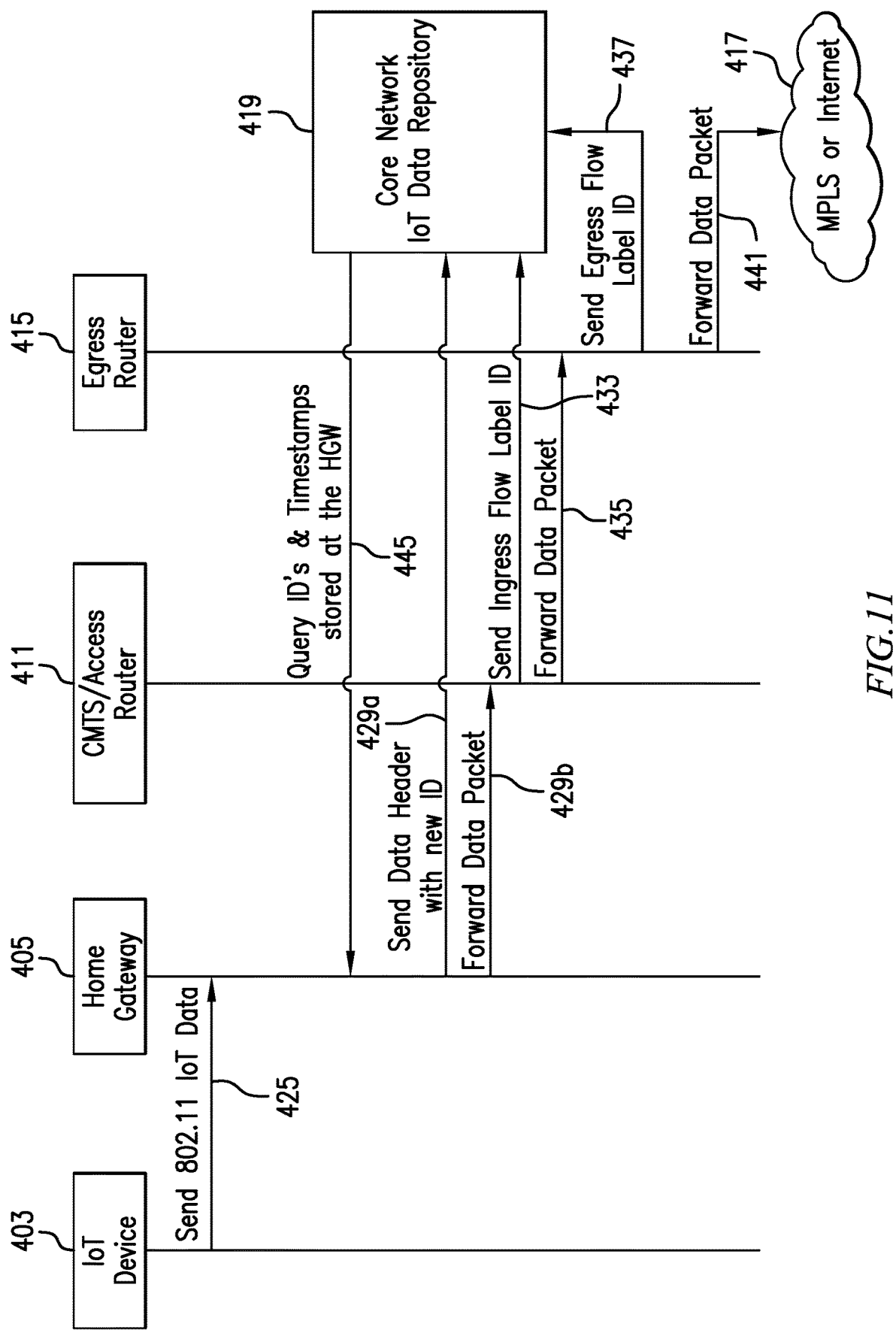
FIG. 11 is a message flow diagram for an IoT data delivery network, according to an aspect of the invention.

FIG. 11 shows a message flow diagram through the IoT data delivery network. The arrows indicate an action toward a destination, not necessarily a physical device. The message numbers shown in FIG. 11 correspond to the numbers in the IoT data delivery network architecture shown in FIG. 10. In step 425, the Registered IoT Device 403, Hub or Smart Speaker 423 sends one or more packets/frames to the HGW 405. In step 429A, the HGW 405 creates a copy of the IoT IPv6 data header with a unique ID and timestamp and sends it to the IoT Data Repository database 419. In step 429B, the HGW 405 forwards the complete and original IoT packet to the AN Router 411. In step 433, the AN Router 411 sends a new copy of the IoT IPv6 header and a current timestamp to the IoT Data Repository database 419. In step 435, the AN Router 411 forwards the complete and original IoT packet to the Core Network Egress Router 415. In step 437, the CN Egress Router 415 sends a copy of the IoT IPv6 data header and a current timestamp to the IoT Data Repository database 419. In step 441, the CN Egress Router 415 forwards the complete and original IoT packet using Non-MSO controlled networks 417 onto the final destination 421. In step 445, periodically, the IoT Data Repository database 419 queries the HGW 405 for all IoT messages sent in order to verify proper operation of the Home Gateway and IoT device transmissions. In one or more embodiments, the period is defined for each device when creating the service-level agreement (SLA) and depends on the criticality of the device's data. Note that 427, 439 are not messages per se and are thus omitted from FIG. 11; furthermore, in the example, message 443 is not an MSO message and is thus also omitted from FIG. 11.

Exemplary Architecture Points for Determining Data Loss: In one or more embodiments, the basic IoT data delivery network architecture includes three data collection points and a data assurance mechanism. Referring again to FIG. 10, the data collection points are identified as points A, B, and C representing message ingress at the home (A) (gateway 405); Access Network ingress (B) (CMTS/access network router 411); and Core Network egress (C) (egress router 415). Point D (IoT data repository 419) is the Data Assurance point.

Network Point A—Unless an IoT device uses cellular or other telecom protocols to communicate, the Cable MSO network is used in one or more embodiments. There are three common methods used to send IoT data to the HGW 405:
  a. The HGW Access Point directly receives IoT wireless signals and forwards them to the Cable MSO Access Network.
  b. The HGW Access Point converts wireless signals from an IoT device to a wired protocol and forwards that data to a wired IoT hub. IoT hub messages may then be forwarded back to the HGW for transport to the Cable MSO Access Network.
  c. The IoT device directly communicates to an IoT hub or Smart Speaker. The hub or speaker then sends messages to the HGW to forward onto the Cable MSO Access Network.

The HGW copies the IoT frame header, adds a unique ID and a timestamp and then temporarily stores this information. The HGW information store is pertinent in one or more embodiments because the HGW is the only Cable MSO-owned device that resides on the subscriber's local area network (LAN) and is therefore the only point along the transmission route proximate to the subscriber at which originating IoT device transmissions can be recorded (this could vary in other embodiments). The HGW then forwards the complete data packet (with the ID in the Flow Label field in the IPv6 header) onto the Access Network using normal routing mechanisms.

Network Point B—The Access Network Router is the entry point into the Cable MSO access network infrastructure which becomes another pertinent point for data collection because this point is the first time the data is fully 'inside' a totally Cable MSO-controlled premise. Data from Registered IoT Devices is recognized at this point and like the HGW, a copy of the packet header is made and sent to the IoT Data Repository database. The IoT header copy is used to mark entrance into the Access Network.

Network Point C—The Egress Router is the final data collection point in one or more embodiments. Like the HGW and the Access Network Router, the Egress Router recognizes a packet from a Registered IoT Device by finding a non-zero value in the Flow Label header field, makes a copy of the packet header, and sends that header copy to the IoT Data Repository database. This header copy is used to mark the exit of the data packet from the Cable MSO-controlled network. The full data packet is delivered to the adjoining external (non-MSO) network associated at that point.

Network Point D—The IoT Data Repository database software agent periodically queries the HGW for a copy of the home premise IoT information store. The IoT Data Repository database compares the HGW entries with its own copy to verify that no Registered IoT Device data was lost between the HGW and the Access Network Router or the Egress router. All the Flow Label header copies with a matching ID are stored with their timestamps. This information is parsed to find any missing entries, and the identification of any missing entries triggers an action to find where the packet drop happened within the system of Cable MSO controlled networks (explained more fully elsewhere herein). This information can also be used to send one or more alerts to notify the subscriber of dropped packets or expected packets that were never received by the HGW.

Identifying Data Loss at Major Network Segments and Triggered Actions: Still referring to FIG. 10, consider the major network segments between points A, B, C, and D, where loss can occur; in particular, arrows 429, 435, and 437. Consider a matrix of triggered actions as a result of data loss in each major network segment. In case of a loss in network segment A-B (arrow 429), in the path from the HGW 405 to the Access Network Router 411, investigate the path from the HGW to the AN Router. In case of a loss in network segment B-C (arrow 435), in the path from the Access Network Router to the Egress Router, investigate the path from the AN Router to the Egress Router. In case of a loss in network segment C-D (arrow 437), from the Egress Router to the Repository, investigate the path from the Egress Router to the Repository.

In one or more embodiments, it is pertinent to determine data loss from a specific network area for purposes of speedy repair and/or accountability reasons. Depending on the IoT type and SLA, a subscriber notification of data loss may or may not be appropriate. Loss between any Subscriber's network device and the HGW may typically be treated as not part of the Cable MSO network unless the HGW is malfunctioning.

One or more embodiments advantageously provide an additional capability beyond existing methods to find packet loss, and specifically from Registered IoT Devices, through the parsing of the database in the IoT Data Repository database.

Network Segment A-B: Packet data loss on the Network Segment A-B can be found from the comparison of the IoT Data Repository database to the HGW data store. As mentioned elsewhere, Network Point D, the IoT Data Repository database, periodically queries the HGW for a copy of the home premise IoT information store, and compares the HGW entries with its own copy to verify that no Registered IoT Device data was lost between the HGW and the Access Network Router.

Data loss can result from several sources:
  The HGW itself, such as a WAN interface defect that did not forward the data (or any data).
  An upstream Cable Modem defect, regardless of same being an integrated or separate physical unit.
  A defect in the coaxial cabling, splitters, or other components from the Cable Modem to the pedestal (small equipment box or cabinet analogous to node 182 typically located adjacent a home or other subscriber premises).
  Any component at the node, hub or head end, including the Access Network Router.

The general action triggered from loss in this network segment is to investigate the devices and network paths. More specifically, patterns are analyzed first, so as to narrow the scope of investigation. An example is if one Registered IoT Device has no packets being sent, but other wireless devices on the customer's LAN have no issues with internet communications, the problem may be localized to the IoT device itself and the investigation should start with this device.

Network Segment B-C: This segment can be complex, involving many separate networks and devices. Traditional network troubleshooting methods are used to find the issue and provide a fix. Most likely, non-IoT traffic is affected as well if transport problems are encountered on this network segment. The general action triggered from loss in this network segment is to narrow the investigation scope, again, by using traditional troubleshooting methods.

Network Segment C-D: More than one IoT Data Repository database may exist in actual implementations. The issues are typically either routing the data to a specific repository or finding the reason(s) that the repository will not accept or store the information. The general action triggered from loss in this network segment is to determine if the problem source is network-based or is with the device(s)/database.

Exemplary Operational Details

Registering Devices that Send Critical and/or Important Data: In one or more examples, before describing the packet flow details in the new architecture and in order that tracking and notification functionality can begin, critical and/or important IoT devices are first identified and registered with the CSP, resulting in an SLA. The originating data source in one or more embodiments is the IoT device itself, but the treatment from critical and/or important data devices is not confined IoT devices only—any device can be registered for tracking and notification functionality. Thus, while any device can qualify, only IoT devices are mentioned in the examples herein for reasons of simplicity. Assume that the IoT source mentioned above is pre-registered with the Cable MSO, and that data from such device is defined as critical or important and therefore tracking the data from the device is desired by both the Cable MSO and the subscriber. Critical and/or important IoT devices are referred to herein as a 'Registered IoT Device.' In one or more embodiments, alerting services and data tracking are confined to registered devices. Both critical and important IoT data are tracked and monitored, but service actions vary depending on the degree of consequence severity. This is discussed further elsewhere herein. Also, for illustrative purposes, unless an IoT device uses cellular or telecom protocols for communications, the assumption is made that the device connects wirelessly to an HGW and uses the Cable MSO's infrastructure for at least partial transport to the final destination.

In one or more embodiments, the device registration process involves an SLA whereby specific IoT devices (or other IP data devices) are identified by manufacturer name, function, MAC address, Serial Number or other identifiers. The devices are functionally characterized by either continuous data transmissions with a known time period or devices that only transmit when a boundary condition has been crossed. Appropriate actions are matched to each registered device when conditions are met, such as emergency notifications, casual alerting, etc. There may be a wide variety of appropriate actions matched to devices because the customer is paying for these services.

Identifying an IoT Device and Gateway Pair: One or more embodiments track data from critical and/or important IoT data devices at both the entry and exit points in a Cable MSO's network and then record those results. Identification includes both the IoT device and the Home Gateway pair that sent critical and/or important IoT data to the Cable MSO network. A method to identify this paired information is advantageously provided, while preserving anonymity for privacy concerns. In one or more embodiments, Cable MSOs track and record the movement of critical and/or important IoT data from the ingress to the egress points in their networks, but do not record the data itself. Most subscribers' data devices still use the IPv4 protocol. A pertinent aspect of one or more embodiments is conversions of IPv4 traffic to the IPv6 protocol at the Home Gateway. There are several methods that provide this conversion; MAP-T (Internet Engineering Task Force (IETF) Request for Comments: 7599, July 2015, X. Li et al., Mapping of Address and Port using Translation (MAP-T)) and MAP-E (Internet Engineering Task Force (IETF) Request for Comments: 7597, July 2015, O. Troan et al., Mapping of Address and Port with Encapsulation (MAP-E)) are non-limiting examples. Any suitable conversion technique can be employed, since the resulting IPv6 headers will have the flow label field in any case. Note that in one or more embodiments, even if the IoT device and the monitoring endpoint are IPv4, internal conversion to IPv6 is still undertaken so as to be able to make use of the flow label field.

One or more embodiments employ IPv6 and repurpose a field in the header called the 'Flow Label.' The Flow Label field has a 20-bit length that defaults to all zeros. In one or more embodiments, the HGW assigns an ID value to indicate the specific IoT device and gateway as a unique pair that is used to send the IoT data to the Cable MSO network.

A unique value to identify the IoT device/gateway pair can be derived, for example, using at least the following two techniques:

1. Hashing—A hash value that fits within the 20-bit limit of the Flow Label header.
2. Mapping—A simple map of a registered IoT device and the subscriber's Home Gateway.

In one or more embodiments, it is believed advantageous that the ID calculation function is performed by an Operations Support Systems (OSS) function, as opposed to the local HGW, although this is not a limitation. Operations Support Systems include, for example, DHCP, DNS and also company-specific systems such as Home Gateway configurators, Tunnel termination systems, and the like. BSS or Business Support Systems include Billing systems, Order systems, inventory systems, and the like. In one or more embodiments, this is done during the IoT Registration process. Both techniques above ensure anonymity even if a Flow Label with an ID is accidentally exposed publicly or internally, because the information cannot be traced to a subscriber or device without the mapping key or hash algorithm. Once an IoT/HGW pair has an assigned unique ID, that value is placed into the IPv6 Flow Label field of any packet transmitted from that device/HGW pair. The 20-bit Flow Label field is sufficient to provide enough unique IDs such that a single CMTS can serve over 40,000 subscribers, where each subscriber can have up to twenty-four Registered IoT Devices. This ensures scalability for the near term; other methods can also be employed to ensure ID extensibility with no practical limit, such as using IPv6 extension headers.

Tracking an IoT Device/Gateway Pair ID: As explained elsewhere herein, in one or more embodiments, there are three points at which the Unique ID (IoT device/Gateway pair information) is copied and sent to the IoT Data Repository database, as described in the table of FIG. 12.

Home Gateway Operational Details: In one or more embodiments, the HGW identifies a data transmission from a Registered IoT Device, either directly or indirectly from an IoT hub or another device. If the HGW does not have an integrated cable modem, a separate Cable MSO-provided cable modem encapsulates the Ethernet frame for transport between the cable modem and the CMTS (or similar device) using DOCSIS protocols or the like. In the non-limiting examples herein, it is assumed that the cable modem is integrated into the HGW device. The HGW then completes the following steps, in one or more embodiments:
1. Identifies packets from a Registered IoT Device using its MAC address or other identifier.
2. Converts from a wireless protocol such as IEEE 802.11ac to a wired protocol such as IEEE 802.3 (Ethernet).
3. Converts IoT device data from IPv4 packets to IPv6 if needed.
4. Assigns a predetermined, unique ID value (IoT and gateway pair) into the IPv6 Flow Label header field.
5. Copies that IPv6 header, applies a timestamp, and:
    a. Stores this header information in non-volatile memory on the gateway.
    b. Forwards this same header information to the IoT Data Repository database.
6. Forwards the complete packet with the modified IPv6 Flow Label to the Access Network Router.
7. Waits for a periodic query from the IoT Data Repository database (or other actor performing this verification step). After acknowledgement that data was successfully transported from the HGW to the IoT Data Repository database, the HGW data stored in step 5a above is reset and ready to be used for new entries.

Access Network Router Operational Details: After the IoT data packet exits the HGW (or the cable modem or the ONU), it traverses the Cable MSO access network, and then is terminated at the Access Network Router. At this point in the access network, the following operations are completed, in one or more embodiments:
1. Identifies in-scope packets by detecting a non-zero IPv6 Flow Label value in the IPv6 header.
2. Copies the IPv6 header, applies a timestamp, and:
    a. Stores this header information in non-volatile memory on the Access Network Router.
    b. Forwards this same header information to the IoT Data Repository database.
3. Forwards the complete packet with the modified IPv6 Flow Label using standard routing procedures throughout the Cable MSO's network infrastructure to the Network Egress Router.
4. Waits for a periodic query from the IoT Data Repository database (or other actor performing this verification step). After acknowledgement that data was successfully transported from the Access Network Router to the IoT Data Repository database, the Access Network Router data stored in step 2a above is reset and ready to be used for new entries.

Egress Network Router Operational Details: In one or more embodiments, standard Cable MSO routing transports critical and/or important IoT data from the Cable MSO Access Network Router which eventually terminates to a router at the edge of the Cable MSO network. At this point in the core network, packets egress from the Cable MSO controlled networks and complete a hand-off to a non-MSO network such as the Internet or MPLS network. The following operations are completed at the Cable MSO Egress Router, in one or more embodiments:
1. Identifies packets of interest by detecting a non-zero IPv6 Flow Label value in the IPv6 header.
2. Copies the IPv6 header, applies a timestamp, and:
    a. Stores this header information in non-volatile memory on the Egress Router.
    b. Forwards this same header information to the IoT Data Repository database.
3. If the external, non-MSO network uses these IP protocols:
    a. IPv6—then reset the IPv6 Flow Label in the header of the complete packet to a value of all zeros and forward to the adjoining network
    b. IPv4—then convert the IP protocol of the packet from IPv6 to IPv4.
4. Forwards the complete packets to the adjoining non-MSO network using current procedures for normal operation.

IoT Data Repository database Operational Details: In one or more embodiments, the IoT Data Repository database contains copies of the IPv6 Flow Label headers and timestamps from three network points that have handled the packets issued from registered IoT device transmissions: the HGW, the Access Network Router, and the Egress Router. This is described elsewhere herein. The purpose of the IoT Data Repository database, in one or more embodiments, is to store the records of the IoT data transmissions as follows:
Initially generated and received at the Home Gateway.
Received at the Access Network Router
Received at the Egress Router
Successfully handed off to the non-MSO adjoining network.

A typical IoT Data Repository database structure example is shown in the table of FIG. 13, where the IoT/HGW ID values are hexadecimal and time is represented as Unix Epoch Time values. In one or more embodiments, any missing timestamp entry in the IoT Data Repository database indicates missing data at that collection point: HGW, AN, or Egress router. If a notification SLA is active, a lack of entries from an IoT device indicates missing data and triggers one or more alerts to the subscriber. Therefore, this table serves as a missing data detection point that triggers proactive alerting, which in turn can provide the customer with notice of the possibility that the customer's IoT devices are not receiving a signal and cannot function as intended.

An example of missing data and corresponding action responses from the table of FIG. 13 is now described:

Entry_1 has no timestamp value delivered from the AN collection point, but has a value from the Egress router collection point. This missing data in inconsequential and no action is taken because the IoT data was received into and egressed from the Cable MSOs system of networks.

Entry_2 is concerning because it represents data loss within the network segment from the HGW and the AN collection points. A triggered action would include investigating these network elements:
If data is missing from many subscribers terminating at the same AN router, that AN router, AN router interface, or physical media attaching to the AN router interface are investigated. As previously stated, this type of data loss most likely affects all data from all sources and not just IoT data.
If data is missing from one subscriber only, faulty components could include the HGW itself, the cabling between the HGW and the CM (if they are separate physical devices), the Coax/Fiber cabling between the CM and the pedestal and every component between the pedestal and the AN.

Entry_3, Entry_4, and Entry_5 provide an example of missing data from an IoT device sending regular and periodic messages once every ten minutes. An SLA is in place where proactive alert notifications are sent if the IoT device does not send data as expected within the stated time period.

Entry_3 and Entry_4 represent normal and expected messages from the IoT device. Entry_5 is expected, but failed to be recorded at any collection-point. Alert notifications are sent to the subscriber and optionally a third party monitoring agency as defined in the SLA.

In one or more embodiments, registered IoT Device data is classified as one of three different types: Critical, Important, or 'of interest' and might, for example, have corresponding SLA service packages labeled as Gold, Silver and Bronze. Cable MSO-triggered actions and sent notifications will vary depending on the class of data and SLA agreement. For example, missing data from a medical pulse monitor can be critical with only a few minutes to respond before health is threatened. This data class is 'critical' and results in immediate notifications to the subscriber and also health professionals and emergency providers. By contrast, an exemplary important message is a power outage to an IoT-monitored large freezer, which could, for example, result in only an informative notification to the subscriber. The contents in the freezer may be unaffected for many hours during a power outage. This important information class is higher than 'of interest' but not critical. The class titled 'of Interest' is data that is not critical or important, but for which the subscriber wants Cable MSO monitoring and notification messages sent.

Lastly, the IoT Data Repository database can be archived as desired or rewritten after a suitable time period as the Cable MSO desires. Database reliability is met, for example, through common practices for redundant server/storage that are in and of themselves known to the skilled artisan, who, given the teachings herein, will be able to adapt same to one or more embodiments.

One or more embodiments provide a data delivery assurance method which plans data tracking in advance for each Registered IoT Device and is governed by subscriber SLAs. One or more embodiments are lightweight in comparison to techniques such as "lawful intercept" because only packet headers are stored; one or more embodiments are fully controlled by the Cable MSO. In one or more embodiments, because only IPv6 headers are copied and stored, privacy issues are successfully addressed.

Advantageously, one or more embodiments are relatively simple to implement, relatively low cost, enable Cable MSOs to introduce new services, are controlled by proactive agreement with the subscriber and third party vendors (SLA), minimize potential issues due to data packet loss, and/or allow deeper Cable MSO integration and involvement with a subscriber's IoT devices. In one or more embodiments, installation and maintenance of additional network functionality includes HGW, access network (AN), and core network (CN) header copies and timestamps, as well as the IoT Data Repository database.

Thus, explosive growth of IoT devices is expected to continue well into the next decade. Subscribers have already embraced the use of IoT devices as conveniences, and are accepting and using a new class of IoT applications to monitor and transmit critical and/or important data in various areas such as personal health, safety, and the like. Currently, if the IoT device critical and/or important data is dropped anywhere in the network between the IoT device and the Cable MSO egress router or the third party monitoring provider across the Internet, then there can be significant consequences to the subscriber. One or more embodiments advantageously provide a novel and simple data delivery assurance method to resolve this problem. The method is based on first registering the IoT device and the HGW pair in the Cable MSO database. The registered IoT IPv6 label header, which has a unique ID, is then used to track the IoT data packet flow through the network. In addition, the registered IoT IPv6 label header is timestamped at various pertinent network elements as the packet is transmitted from the HGW to the Cable MSO egress router, and stored at the IoT data repository database. If an IoT data packet is lost in the Cable MSO network, a matrix of triggered actions is used at the identified network segment. Depending on the IoT type, data type, and SLA, the subscriber may receive a notification for the loss of IoT data packets. The IPv6 header reuse is a transparent function to both the IoT devices and the network elements beyond the Cable MSO network infrastructure. This ensures that non-MSO devices and network elements function normally when this solution is applied.

In one or more embodiments, strong partnerships between Cable MSOs and external third party monitoring agencies can result in proactive data loss notifications that are sent to both the subscriber and the monitoring agency for faster resolution and lessening the impact of missing data. One or more embodiments are relatively simple to implement and administer.

Wireless cellular technology is currently being used in many cases for IoT data transport. However, cellular carriers do not have the tracking and alerting capabilities or the granular focus to support a per-IoT device SLA contract. Embodiments of the exemplary IoT Data Delivery Assurance method disclosed herein enable Cable MSOs to provide an alternative low-cost solution to guarantee the delivery of critical and/or important IoT data from the home or the business to the third party monitoring companies.

Figure 14:
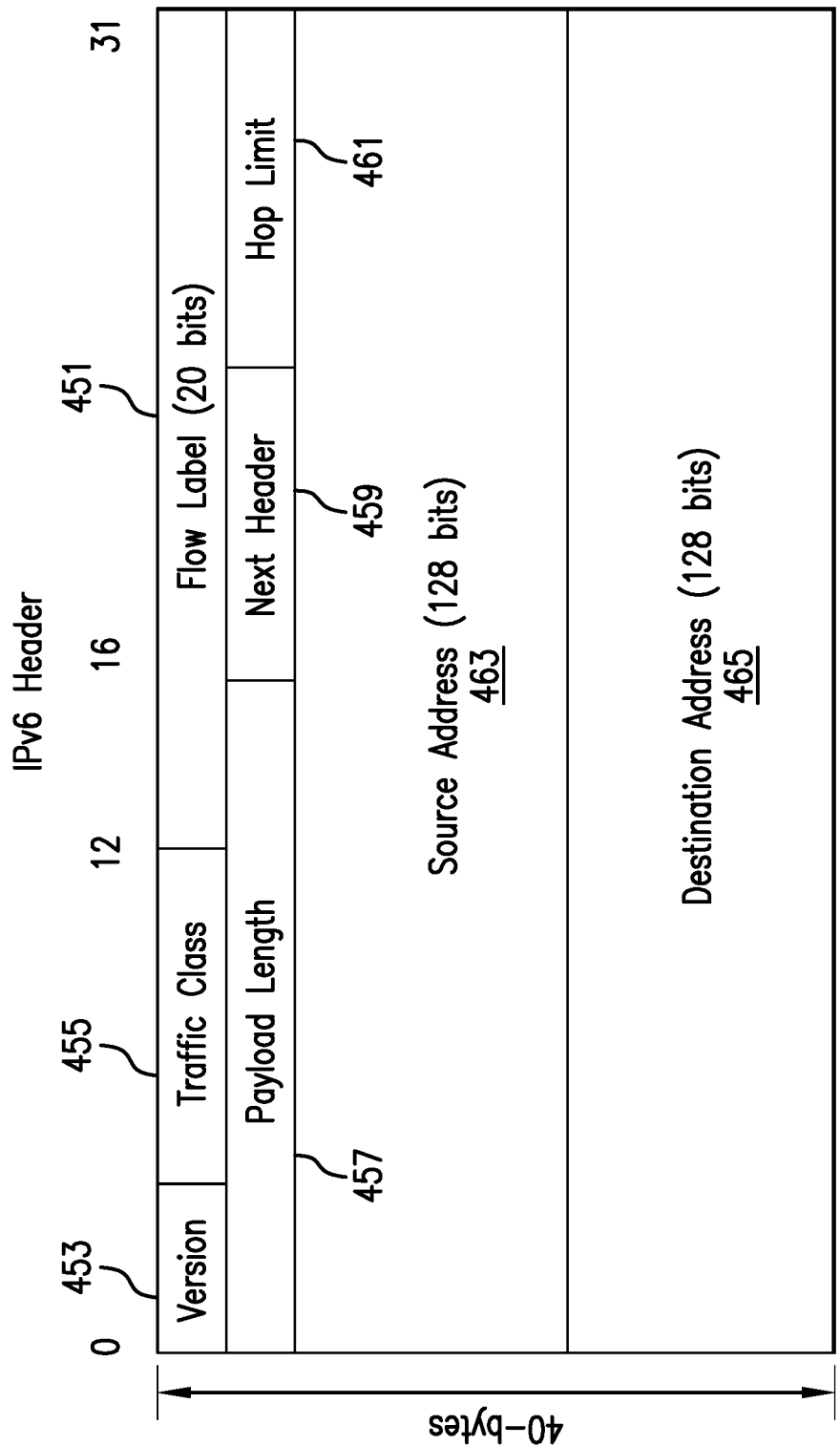
FIG. 14 is an IPv6 header with a re-purposed flow label, according to an aspect of the invention.

FIG. 14 shows IPv6 header fields including the IPv6 Flow Label field 451. Flow label field 451 is largely unused and can be repurposed to include a unique ID, formed to represent: (i) a specific IoT device in the home/premises; and (ii) a subscriber's home gateway. Other fields in the IPv6 header, familiar to the skilled artisan, include the version 453, traffic class 455, payload length 457, next header 459, hop limit 461, source address 463, and destination address 465.

Some embodiments are applicable in an environment wherein Home Gateway functions are virtualized and moved into the cloud as a virtual gateway (vGW). Examples include a virtual firewall (vFirewall), vIMS (Virtual IP Multimedia Subsystem) Network, virtual parental controls, virtual router (vRouter), vIDS (virtual intrusion detection system), virtual network address translation (vNAT), and the like. One or more embodiments advantageously address potential security issues in such an environment:

How can the vGW trust source data from the home router?
How can the home router trust execution by the vGW?
How can the home router and vGW trust the transport?

Thus, one or more embodiments address critical IoT devices (e.g. heart monitor) in the home, and the need to ensure that the packets are delivered to the final destination. One or more embodiments ensure that packets are reliably delivered. As noted above, many current IoT devices are "toys"—that is to say, loss of packets would not be particularly worrisome. However, the advent of more critical IoT devices is at hand: e.g., health monitoring, security, monitoring valued personal property (e.g. saltwater fish tank filled with expensive exotic fish), outdoor environmental monitoring, a refrigerated truck filled with expensive food, and the like. Failure of the monitors could cause significant property damage, health or safety issues. One or more embodiments advantageously allow tracking of dropped packets. Currently, Constrained Application Protocol (COAP) is employed as the return mechanism for dropped packets. When an IoT device sends a message and the intended recipient receives the message, it often sends a response if the communication is critical. However, if the packet is lost, no response will be received.

One or more embodiments track the packets beginning at the home gateway 405. Receipt is tracked—the packet originates from the IoT device 403 or its hub (for example some "smart" light bulbs communicate with a hub 423 which then communicates with the gateway 405). The packet is tracked outside the premises into the access network, to the CMTS 411. One or more embodiments determine whether the packet successfully traverses through the system of networks to the egress router 415, where it leaves the MSO's network and passes into a network 417 that is not controlled by any MSO (e.g. the Internet or Multiprotocol Label Switching (MPLS)).

One or more embodiments provide tracking within the MSO system to ensure the system is healthy and/or to pinpoint problems, and offer a proactive service wherein if a customer has a critical (e.g. healthcare) or important (at least to the customer) IoT device, expected to "chirp" once every ten minutes, and if it stops chirping, advise the customer. In one or more embodiments, construct a service level agreement (SLA) and monitor the messages every ten minutes (or other predetermined period) and if not delivered as expected, send out an alert. In the fish tank example, suppose the temperature is sent every ten minutes or aerator status is sent once every ten minutes, and those communications stop—there could be a problem. In the fish tank example, the MSO notifies the customer. In the heart monitor example, the MSO notifies emergency services. Refer to the discussion of the three collection points A, B, and C as discussed above.

The IoT data repository 419 collects the information from the three collecting points A, B, and C. Analysis is undertaken to see whether the message got to all three of those points. If not, take action. If it did, then record it.

If an IoT device is to be tracked, it should have an identification (ID). In one or more embodiments, at the home gateway 405, use IPv6, whether or not IPv6 was originally used. One or more embodiments repurpose a field in the header called the flow label. The flow label creates an ID that says, in effect, this specific IoT device and this specific gateway as a subscriber, will be summarized into this unique value. Now the system has a tag or value that can be tracked at the home gateway and throughout the MSO network. Just before the message leaves the MSO network, that field is re-set to all zeroes, because its purpose is over. If the receiver of that packet is using IPv4, the message is translated back to IPv4. It is under the control of the MSO to say, in effect, "we are going to use IPv6 only during transport and repurpose the flow label field to provide a unique ID for every IoT device of every subscriber."

If, for example, a household has twenty-four IoT devices for which they desire to create an SLA to monitor, the system can scale up to about 43,000 subscribers, each with twenty-four IoT devices. Today, the maximum number of subscribers on CMTS is typically about 35,000—therefore, the scheme scales because it does not run out of IDs.

Thus, in one or more embodiments, the gateway 405 places the ID in the flow label field, the CMTS 411 acknowledges it, and the packet goes through the MSO network. Once it leaves the MSO network, the label is removed and a record is made that it was delivered out to the part of the Internet 417 beyond the MSO's control.

One or more embodiments initiate mitigating actions in response to a packet not being received as expected. Mitigating actions include internal and external actions. Internal mitigation assumes something wrong with internal systems. Still referring to FIG. 10, considering the data repository D, it can be determined whether the loss is from A to B, B to C, or C to D. The MSO can quickly narrow down where the problems are occurring. At each intermediate spot along the path (or at least the three critical links), if the packet is not received, write to the Repository D. It is easy to know of a miss from B to C or from C to D. It is harder to know of a miss from A to B, because it is not necessarily clear what aspects the home gateway has. Therefore, one or more embodiments provide a procedure wherein the repository D periodically queries the gateway A and compares it to its own list to see if something was not delivered from A to B. Refer to the table of FIG. 13.

Entry_1 and Entry_2 have an internal focus. In Entry_1, the gateway has a time stamp and ID. The ID represents specific IoT device and gateway together. Nothing is recorded at the access network but receipt is recorded at the egress router, so it can be concluded that there is no issue, mere monitoring should be appropriate. Entry_2 is more of a concern. The home gateway received the packet, but nothing else in the MSO network received the packet—since it was not recorded at access or egress, it is a significant concern.

Regarding external mitigation, a planned SLA can be created for the customer, who has a critical, important, or "of interest" application. The planned SLA will specify, e.g., payment and what service is expected from the MSO for every specific device it is desired to monitor. See Entry_3, Entry_4, and Entry_5. Entry_3 indicates "OK," while Entry_4 indicates a normal "chirp" 10 minutes later and Entry_5 says nothing at all at the time when the next chirp is expected. Because of the SLA, expect a chirp every ten minutes—when missing, take action as set forth in the SLA—e.g., notify the subscriber; notify the subscriber plus a support entity such as a monitoring service, notify emergency services, or the like. In some instances, trigger a reaction if the endpoint does not receive the packet at the next expected time. For example, send a signal to a server to cause it to initiate a mitigation action something rather than having a human make a phone call.

As noted, advantageously, one or more embodiments are lightweight, do not store actual data, but only store the headers. This addresses privacy concerns and makes the technique scalable because the amount of information being stored is relatively small.

Multiple use cases are possible; for example, a "most important" level could relate to personal safety; a "medium important" level could relate to property damage, and a "least important" level could relate to data merely of "subscriber interest."

One or more embodiments provide, as a service, notification of missing IP packets from an IP device of interest to a customer and/or external agency.

Recapitulation

Given the discussion thus far, it will be appreciated that, in general terms, an exemplary method, according to an aspect of the invention, includes obtaining, from a subscriber premises (e.g. home or business) gateway 405, a data packet having a header field (e.g. 451) including a unique identifier for a combination of the gateway 405 and a connected subscriber internet protocol device (e.g., a connected internet of things (IoT) device 403 and/or 423). A further step includes transporting the data packet through an internal network 409 of a broadband service provider. A still further step includes removing the header field after the transporting and prior to the data packet exiting the internal network of the broadband service provider to an external network 417. Non-limiting examples of removing the header field include zeroing it out or converting to a version of the Internet protocol where the header field does not exist (e.g., convert IPv6 to IPv4).

Another step includes storing, in a subscriber internet protocol device data repository (e.g., an internet of things (IoT) data repository 419) of the broadband service provider, data, including the header field, representing transport of the data packet through the internal network of the broadband service provider to the external network. An additional step includes detecting, based on the data repository (see, e.g., discussion of table of FIG. 13), at least one of an internal and an external anomaly associated with the data packet. An even further step includes initiating at least one mitigation action in response to the detecting of the at least one of an internal and an external anomaly.

In one or more embodiments, the data stored in said subscriber internet protocol device data repository further includes corresponding timestamps.

One or more embodiments store, in the internet of things (IoT) data repository, only the header field without any corresponding payload.

In one or more embodiments, the connected internet of things (IoT) device is registered with the broadband service provider; the storing is responsive to the registration. For example, register by storing registration data in a business support system (BSS) component coupled to the CMTS 156, 411. In a non-limiting example, billing module 152 is part of the BSS, which will typically also encompass other elements as will be familiar to the skilled artisan. Registration data can be stored in other locations and/or in multiple locations; in one or more embodiments, registration is linked to an SLA because the subscriber requires specific actions (some different) for each IoT device that is tracked.

In one or more embodiments, in the obtaining step, the data packet is an internet protocol version six (IPv6) data packet.

As appropriate, a further step can include converting the internet protocol version six (IPv6) data packet to an internet protocol version four (IPv4) data packet, prior to the data packet exiting the internal network of the broadband service provider to the external network 417 (say, if service 421 uses IPv4).

In one or more embodiments, in the obtaining step, the header field is a repurposed internet protocol version six (IPv6) flow label field 451.

In one or more embodiments, the data packet employs User Datagram Protocol (UDP) without acknowledgement features, making the verification aspects of one or more embodiments particularly pertinent.

In a non-limiting example, the obtaining step includes obtaining the data packet at an access network router device (e.g. CMTS/access network router 411) of the internal network of the broadband service provider; and the removing step includes removing the header field with an egress router 415 of the internal network of the broadband service provider.

In one or more embodiments, the detecting includes detecting at least the internal anomaly associated with the data packet, and the internal anomaly includes at least one of: (i) dropping of the packet in a first segment (A-B) between the premises gateway and the access network router device; dropping of the packet in a second segment (B-C) between the access network router device and the egress router; and dropping of the packet in a third segment (C-D) between the egress router and the internet of things (IoT) data repository. In at least some such embodiments, the at least one mitigation action includes investigating at least a corresponding one of the first, second, and third segments.

In some cases, the obtaining includes obtaining a plurality of the data packets, including verification chirps, at predetermined timestamped chirp intervals; and the detecting includes detecting at least the external anomaly, based on absence of at least an expected one of the verification chirps in the internet of things (IoT) data repository. Refer to the table of FIG. 13, Entry_3, Entry_4, and Entry_5, for example. In at least some such cases, the at least one mitigation action includes at least one processor associated with the internet of things (IoT) data repository (e.g. processor 720 of a database server hosting the repository) initiating a signal (e.g., over the network) to notify at least one of: a subscriber associated with the premises gateway, an external monitoring service 421 associated with the internet of things (IoT) device, an emergency medical service, a security service, and a fire department.

As noted above, in one or more embodiments, the internet of things (IoT) data repository periodically queries the premises gateway to verify consistency of the data repository.

In one or more embodiments, the premises gateway 405 inserts into the data packet the header field including the unique identifier for the combination of the gateway and the connected internet of things (IoT) device. As needed, in one or more embodiments, the premises gateway converts the data packet from an internet protocol version four (IPv4) data packet to an internet protocol version six (IPv6) data packet. Furthermore, in a typical but non-limiting example, the premises gateway receives the data packet wirelessly from the internet of things (IoT) device and transmits the data packet via a wired connection to the access network router device.

In another aspect, an exemplary system includes an access network router device (e.g., CMTS/access network router 411); an egress router 415; a database server storing a subscriber internet protocol device data repository (e.g., an internet of things (IoT) data repository 419) of a broadband service provider; and an internal network 409 of the broadband service provider, coupling the access network router device, the egress router, and the database server storing the subscriber internet protocol device data repository. In one or more embodiments, the access network router device obtains, from a premises gateway (e.g., 405 and/or a virtual gateway), a data packet having a header field 451 including a unique identifier for a combination of the gateway and a connected subscriber internet protocol device (e.g., a connected internet of things (IoT) device 403 and/or 423). The internal network of the broadband service provider transports the data packet. The egress router 415 removes the header field after the transporting and prior to the data packet exiting the internal network of the broadband service provider to an external network 417. The database server stores, in the subscriber internet protocol device data repository of the broadband service provider, data, including the header field, representing transport of the data packet through the internal network of the broadband service provider to the external network. The database server (e.g. software agent for the repository) detects, based on the data repository, at least one of an internal and an external anomaly associated with the data packet. The database server (e.g. software agent for the repository) initiates at least one mitigation action in response to the detecting of the at least one of an internal and an external anomaly. In one or more embodiments, alerts take place inside the CSP if something is amiss. One or more embodiments can alert the subscriber, depending on the SLA. One or more embodiments can alert both the subscriber and a third-party entity, or just the third-party entity itself. An "external anomaly" as used herein encompasses a malfunction at the gateway 405 (endpoint of the CSP network), device/hub 403, 423, or between the gateway 405 and device/hub 403, 423 within the subscriber's premises. An "external anomaly" is not intended to necessarily imply knowledge of a malfunction beyond the egress router 415 in external network 417.

In one or more embodiments, the data stored in said subscriber internet protocol device data repository further includes corresponding timestamps.

In one or more embodiments, the internet of things (IoT) data repository 419 stores the header field only, without any corresponding payload.

In at least some cases, the access network router device 411 acts on the data packet based on pre-registration. In one or more embodiments, the routers 411, 415 do not recognize the registered IoT device per se, but rather recognize a non-zero value in the Flow Label field, and then begin some action. That action could be verifying the value to a table of registered values, or, it could be as simple as assuming a non-zero value indicates a registered IoT device. In one or more embodiments, the CSP controls the Flow Label Header in the IPv6 packet. If there is a valid non-IoT value in the Flow Label field, an extension header (a nested IPv6 header) can be applied to allow the use of non-zero values that are not IoT related.

In one or more embodiments, the data packet includes an internet protocol version six (IPv6) data packet. Where appropriate, the egress router converts the internet protocol version six (IPv6) data packet to an internet protocol version four (IPv4) data packet, prior to the data packet exiting the internal network of the broadband service provider to the external network (for example, when monitoring service 421 uses IPv4).

In some cases, the egress router zeroes out the header field, prior to the data packet exiting the internal network of the broadband service provider to the external network. For example, if the final destination is IPv6 capable, this conversion to IPv4 need not take place. Instead, the existing IPv6 header will be used, but the Flow Label field will be reset to a value of zero, in one or more embodiments.

In one or more embodiments, the header field is a repurposed internet protocol version six (IPv6) flow label field 451.

In one or more embodiments, the data packet employs User Datagram Protocol (UDP) without acknowledgement features, which, as noted, makes tracking aspects of one or more embodiments particularly useful.

In some instances, the database server detects at least the internal anomaly associated with the data packet, and the internal anomaly includes one or more of dropping of the packet in a first segment (A-B) between the premises gateway and the access network router device; dropping of the packet in a second segment between the access network router device and the egress router (B-C); and dropping of the packet in a third segment (C-D) between the egress router and the internet of things (IoT) data repository. In at least some such cases, the at least one mitigation action initiated by the database server includes investigating at least a corresponding one of the first, second, and third segments.

Referring to Entry_3, Entry_4, and Entry_5 of the table of FIG. 13, in some cases, the access network router device obtains a plurality of the data packets, including verification chirps, at predetermined timestamped chirp intervals; and the database server detects at least the external anomaly, based on absence of at least an expected one of the verification chirps in the internet of things (IoT) data repository. In at least some such cases, the at least one mitigation action includes the database server initiating a signal to notify at least one of: a customer associated with the premises gateway, an external monitoring service 421 associated with the internet of things (IoT) device, an emergency medical service, a security service, and a fire department.

In one or more embodiments, the internet of things (IoT) data repository 419 periodically queries the premises gateway 405 to verify consistency of the data repository.

In some cases, the system further includes the premises gateway 405; the same is coupled to the access network router device 411 (e.g. by corresponding portions of an HFC or FTTP network). The premises gateway device inserts into the data packet the header field including the unique identifier for the combination of the gateway and the connected internet of things (IoT) device.

In one or more embodiments, the premises gateway converts the data packet from an internet protocol version four (IPv4) data packet to an internet protocol version six (IPv6) data packet, and/or the premises gateway receives the data packet wirelessly from the internet of things (IoT) device and transmits the data packet via a wired connection to the access network router device.

The premises gateway can be a physical premises gateway 405 physically located in a customer premises 240 and/or the premises gateway can be a virtual premises gateway 481 virtualized on one or more processors physically located in premises of the broadband service provider. In some embodiments, network functions have a shared premise consisting of both the subscriber's Home Gateway and a Virtual Gateway in the CSP internal system of networks.

In one or more embodiments, each collection point (A, B and C) not only sends the header of the IPv6 packet, but also an associated timestamp. The timestamp provides pertinent information to emergency services, especially, for example, medical. It could also be used to verify that the CSP did not drop any pertinent packets.

System and Article of Manufacture Details

The invention can employ, for example, a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i)

specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
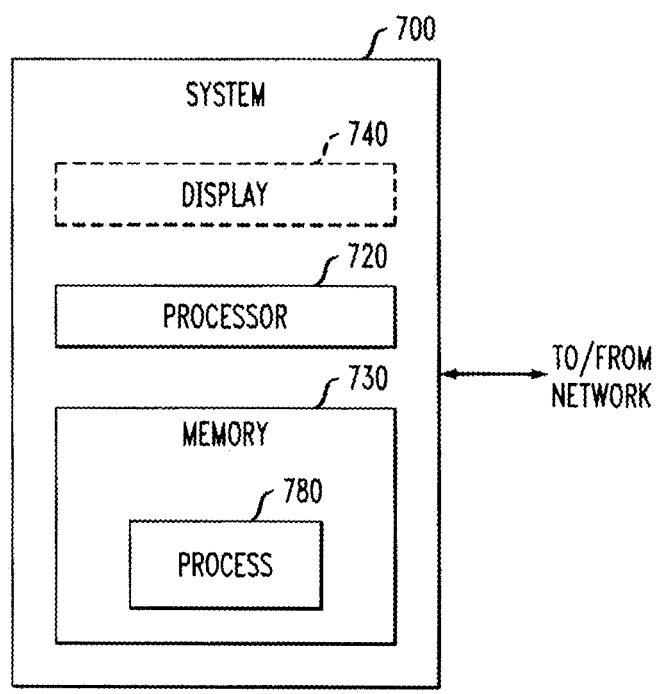
FIG. 7 is a block diagram of a computer system useful in connection with one or more aspects of the invention.

FIG. 7 is a block diagram of a system 700 that can implement at least some aspects of the invention, and is representative, for example, of aspects of one or more of the servers, routers, devices, etc. shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a processor of a device, router, virtualized or non-virtualized hardware server, or the like, implementing one or more of the blocks/sub-blocks in FIG. 10 and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of providing wireless access, switching, routing, NAT, IPv4/IPv6 conversion and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks in FIG. 10 and the like). The method steps can then be carried out using the distinct software modules of the system, as described above, executing on one or more hardware processors (e.g., one or more hardware processors of a device, router, virtualized or non-virtualized hardware server, or the like. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining, from a subscriber premises gateway, a data packet having a header field including a unique identifier that identifies a combination of said gateway and a connected subscriber internet protocol device;
   transporting said data packet through an internal network of a broadband service provider;
   removing said header field after said transporting and prior to said data packet exiting said internal network of said broadband service provider to an external network;
   storing, in a subscriber internet protocol device data repository of said broadband service provider, data, including said header field, representing transport of said data packet through said internal network of said broadband service provider to said external network;
   detecting, based on said data repository, at least one of an internal and an external anomaly associated with said data packet; and
   initiating at least one mitigation action in response to said detecting of said at least one of an internal and an external anomaly.

2. The method of claim 1, wherein:
   in said obtaining step, said connected subscriber internet protocol device comprises a connected subscriber internet of things (IoT) device; and
   in said storing step:
      said subscriber internet protocol device data repository comprises a subscriber internet of things (IoT) device data repository; and
      said data stored in said subscriber internet protocol device data repository further comprises corresponding timestamps.

3. The method of claim 2, wherein said storing in said internet of things (IoT) data repository comprises storing said header field only without any corresponding payload.

4. The method of claim 3, further comprising registering said connected internet of things (IoT) device with said broadband service provider, wherein said storing is responsive to said registration.

5. The method of claim 4, wherein, in said obtaining step, said data packet comprises an internet protocol version six (IPv6) data packet.

6. The method of claim 5, further comprising converting said internet protocol version six (IPv6) data packet to an internet protocol version four (IPv4) data packet, prior to said data packet exiting said internal network of said broadband service provider to an external network.

7. The method of claim 5, wherein, in said obtaining step, said header field comprises a repurposed internet protocol version six (IPv6) flow label field.

8. The method of claim 4, wherein said data packet employs User Datagram Protocol (UDP) without acknowledgement features.

9. The method of claim 4, wherein:
   said obtaining step comprises obtaining said data packet at an access network router device of said internal network of said broadband service provider; and
   said removing step comprises removing said header field with an egress router of said internal network of said broadband service provider.

10. The method of claim 9, wherein said detecting comprises detecting at least said internal anomaly associated with said data packet, said internal anomaly comprising at least one of:
    dropping of said packet in a first segment between said premises gateway and said access network router device;
    dropping of said packet in a second segment between said access network router device and said egress router; and
    dropping of said packet in a third segment between said egress router and said internet of things (IoT) data repository.

11. The method of claim 10, wherein said at least one mitigation action comprises investigating at least a corresponding one of said first, second, and third segments.

12. The method of claim 9, wherein:
    said obtaining comprises obtaining a plurality of said data packets, comprising verification chirps, at predetermined timestamped chirp intervals; and
    said detecting comprises detecting at least said external anomaly, based on absence of at least an expected one of said verification chirps in said internet of things (IoT) data repository.

13. The method of claim 12, wherein said at least one mitigation action comprises at least one processor associated with said internet of things (IoT) data repository initiating a signal to notify at least one of: a subscriber associated with said premises gateway, an external monitoring service associated with said internet of things (IoT) device, an emergency medical service, a security service, and a fire department.

14. The method of claim 4, further comprising said internet of things (IoT) data repository periodically querying said premises gateway to verify consistency of said data repository.

15. The method of claim 4, further comprising said premises gateway inserting into said data packet said header field including said unique identifier for said combination of said gateway and said connected internet of things (IoT) device.

16. The method of claim 15, further comprising said premises gateway converting said data packet from an internet protocol version four (TPv4) data packet to an internet protocol version six (TPv6) data packet.

17. The method of claim 15, further comprising said premises gateway receiving said data packet wirelessly from said internet of things (IoT) device and transmitting said data packet via a wired connection to said access network router device.

18. A system, comprising: an access network router device; an egress router;
    a database server storing a subscriber internet protocol device data repository of a broadband service provider; and
    an internal network of said broadband service provider, coupling said access network router device, said egress router, and said database server storing said subscriber internet protocol device data repository; wherein:
    said access network router device obtains, from a premises gateway, a data packet having a header field including a unique identifier that identifies for a combination of said gateway and a connected subscriber internet protocol device;
    said internal network of said broadband service provider transports said data packet: said egress router removes said header field after said transporting and prior to said data packet exiting said internal network of said broadband service provider to an external network;
    said database server stores, in said subscriber internet protocol device data repository of said broadband service provider, data, including said header field, representing transport of said data packet through said internal network of said broadband service provider to said external network;

said database server detects, based on said data repository, at least one of an internal and an external anomaly associated with said data packet; and said database server initiates at least one mitigation action in response to said detecting of said at least one of an internal and an external anomaly.

19. The system of claim 18, wherein:

said connected subscriber internet protocol device comprises a connected subscriber internet of things (IoT) device;

said subscriber internet protocol device data repository comprises a subscriber internet of things (IoT) device data repository; and said data stored in said subscriber internet protocol device data repository further comprises corresponding timestamps.

20. The system of claim 19, wherein said internet of things (IoT) data repository stores said header field only without any corresponding payload.

21. The system of claim 20, wherein said access network router device acts on said data packet based on pre-registration.

22. The system of claim 21, wherein said data packet comprises an internet protocol version six (IPv6) data packet.

23. The system of claim 22, wherein said egress router converts said internet protocol version six (IPv6) data packet to an internet protocol version four (IPv4) data packet, prior to said data packet exiting said internal network of said broadband service provider to said external network.

24. The system of claim 22, wherein said egress router zeroes out said header field, prior to said data packet exiting said internal network of said broadband service provider to said external network.

25. The system of claim 22, wherein said header field comprises a repurposed internet protocol version six (IPv6) flow label field.

26. The system of claim 21, wherein said data packet employs User Datagram Protocol (UDP) without acknowledgement features.

27. The system of claim 21, wherein said database server detects at least said internal anomaly associated with said data packet, said internal anomaly comprising at least one of:

dropping of said packet in a first segment between said premises gateway and said access network router device;

dropping of said packet in a second segment between said access network router device and said egress router; and dropping of said packet in a third segment between said egress router and said internet of things (IoT) data repository.

28. The system of claim 27, wherein said at least one mitigation action initiated by said database server comprises investigating at least a corresponding one of said first, second, and third segments.

29. The system of claim 21, wherein:

said access network router device obtains a plurality of said data packets, comprising verification chirps, at predetermined timestamped chirp intervals; and said database server detects at least said external anomaly, based on absence of at least an expected one of said verification chirps in said internet of things (IoT) data repository.

30. The system of claim 29, wherein said at least one mitigation action comprises said database server initiating a signal to notify at least one of: a customer associated with said premises gateway, an external monitoring service associated with said internet of things (IoT) device, an emergency medical service, a security service, and a fire department.

31. The system of claim 21, wherein said internet of things (IoT) data repository periodically queries said premises gateway to verify consistency of said data repository.

32. The system of claim 21, further comprising said premises gateway, coupled to said access network router device, wherein said premises gateway inserts into said data packet said header field including said unique identifier for said combination of said gateway and said connected internet of things (IoT) device.

33. The system of claim 32, wherein said premises gateway converts said data packet from an internet protocol version four (IPv4) data packet to an internet protocol version six (IPv6) data packet.

34. The system of claim 32, wherein said premises gateway receives said data packet wirelessly from said internet of things (IoT) device and transmits said data packet via a wired connection to said access network router device.

35. The system of claim 32, wherein said premises gateway comprises a physical premises gateway physically located in a customer premises.

* * * * *